(12) United States Patent
Bertini et al.

(10) Patent No.: US 8,101,034 B2
(45) Date of Patent: *Jan. 24, 2012

(54) METHOD FOR EXTENDING LONG-TERM ELECTRICAL POWER CABLE PERFORMANCE

(75) Inventors: Glen J. Bertini, Tacoma, WA (US); Gary A. Vincent, Midland, MI (US)

(73) Assignee: Novinium, Inc., Federal Way, WA (US)

( * ) Notice: Subject to any disclaimer, the term of this patent is extended or adjusted under 35 U.S.C. 154(b) by 590 days.

This patent is subject to a terminal disclaimer.

(21) Appl. No.: 12/349,440

(22) Filed: Jan. 6, 2009

(65) Prior Publication Data

US 2009/0176960 A1    Jul. 9, 2009

(51) Int. Cl.
    *B32B 37/00* (2006.01)
(52) U.S. Cl. ............ 156/48; 264/36.19; 29/857; 29/858; 29/859
(58) Field of Classification Search .................... 156/48; 29/854–859; 264/36.19; 174/25, 25 P, 84 R, 174/88 RC
See application file for complete search history.

(56) References Cited

U.S. PATENT DOCUMENTS

| | | | |
|---|---|---|---|
| 3,956,420 A | 5/1976 | Kato et al. | |
| 4,144,202 A | 3/1979 | Ashcraft et al. | |
| 4,212,756 A | 7/1980 | Ashcraft et al. | |
| 4,299,713 A | 11/1981 | Maringer et al. | |
| 4,372,988 A | 2/1983 | Bahder | |
| 4,400,429 A | 8/1983 | Barlow et al. | |
| 4,543,381 A | 9/1985 | Barlow et al. | |
| 4,545,133 A | 10/1985 | Fryszczyn et al. | |
| 4,612,139 A | 9/1986 | Kawasaki et al. | |
| 4,766,011 A | 8/1988 | Vincent et al. | |
| 4,870,121 A | 9/1989 | Bamji et al. | |
| 5,200,234 A | 4/1993 | Bertini | |
| 5,372,840 A | 12/1994 | Kleyer et al. | |
| 5,372,841 A | 12/1994 | Kleyer et al. | |
| 5,719,218 A | 2/1998 | Sama | |
| 5,907,128 A | 5/1999 | Lanan et al. | |
| 6,005,055 A | 12/1999 | Dammert et al. | |
| 6,015,629 A | 1/2000 | Heyer et al. | |
| 6,162,491 A | 12/2000 | Bertini | |
| 6,697,712 B1 | 2/2004 | Bertini et al. | |

(Continued)

FOREIGN PATENT DOCUMENTS

EP          0274101          7/1988

OTHER PUBLICATIONS

Premedia Business Magazines & Media Inc., Submarine Cable Rescued With Silicone-Based Fluid, Transmission & Distribution World, Jul. 1, 1999, 4 pgs. USA.

(Continued)

*Primary Examiner* — Jeff Aftergut
(74) *Attorney, Agent, or Firm* — Davis Wright Tremaine LLP; George C. Rondeau, Jr.

(57) ABSTRACT

An improved method for imparting excellent long-term dielectric performance to an in-service electrical cable section having a stranded conductor surrounded by a conductor shield encased in a polymeric insulation and having an interstitial void volume in the region of the conductor, the cable section having an average operating temperature T is disclosed. The method comprises injecting a dielectric enhancement fluid composition into the interstitial void volume.

18 Claims, 22 Drawing Sheets

U.S. PATENT DOCUMENTS

| | | |
|---|---|---|
| 7,195,504 B2 | 3/2007 | Bertini et al. |
| 7,353,601 B1 * | 4/2008 | Bertini .......................... 29/858 |
| 7,700,871 B2 | 4/2010 | Bertini et al. |
| 2004/0170587 A1 | 9/2004 | Vondruska |
| 2005/0189130 A1 | 9/2005 | Bertini et al. |
| 2005/0191910 A1 | 9/2005 | Bertini et al. |
| 2005/0192708 A1 | 9/2005 | Bertini |
| 2007/0046668 A1 | 3/2007 | Bertini |
| 2007/0169954 A1 | 7/2007 | Bertini et al. |

OTHER PUBLICATIONS

Jenkins, Kim, UTILX Corp., Submarine Cable Rescued With Silicone-Based Fluid (Slide Presentation) 18 pgs, USA.

Glen J. Bertini, Entergy Metro Case Study, Post-Treatment Lessons, ICC Meeting, Apr. 1997, Scottsdale, Arizona, USA.

IEEE Power Engineering Society, Insulated Conductors Committee Meeting, Minutes of the 104th Meeting, Oct. 25-26, 1998, 4 pages, GB600565-GB600568, St. Petersburg, FL, USA.

Glen J. Bertini, UTILX Corp., Recent Advancements in Cable Rejuvenation Technology, IEEE/PES 1999 Summer Meeting, Reliability Centered Maintenance, Jul. 21, 1999, 5 pgs.

A.L. McKean, "Breakdown Mechanism Studies in Crosslinked Polyethylene Cable," IEEE Transactions on Power Apparatus and Systems, vol. PAS-95, No. 1, Jan./Feb. 1976, Yonkers, NY, USA .

R. Hudson M. Crucitt, Salt River Project, SRP Enhance Reliability of Underground Distribution Cable, 4 pgs, http//www.tdworld.com/mag/power_srp_enhances_reliability/.

Glen J. Bertini, IEEE, UTILX Corp., Enhancing the Reliability of Solid-dielectric Cables, 4 pgs., Kent, Washington, USA.

IEEE Power Engineering Society, The Importance of Diffusion and Water Scavenging in Dielectric Enhancement, Technical Paper Summaries, 7 pages.

Glen J. Bertini, "New Developments in Solid Dielectric Life Extension Technology," IEEE International Symposium on Electrical Insulation, Sep. 2004.

Bertini, "Accelerated Aging of Rejuvenated Cables—Part I," ICC, Sub. A, Apr. 19, 2005.

Bertini, "Accelerated Aging of Rejuvenated Cables—Part II," ICC, Sub A, Nov. 1, 2005.

Glen J. Bertini, IEEE/PES 1999, "Recent Advancements in Cable Rejuvenation Technology," UTILX Corp., Jul. 21, 1999.

Bertini and Chatterton, "Dielectric Enhancement Technology," Mar./Apr. 1994 IEEE Electrical Insulation Magazine.

Kato et al., "Effect and Mechanism of Some New Voltage Stabilizers for Cross-Llinked Polyethylene Insulation," Annual Report Conference on Electrical Insulation and Dielectric Phenomena, pp. 229-238, 1974.

Cost Savings Model for Power Cables—methodology for testing/treating/replacing cable segments [UTILX website http://www.wiredynamix.com/npv/npv.aspx].

Bertini, "Further Improvements in Rejuvenation Technology," presented at ICC Conference, Apr. 18, 2005, Discussion Group C26D.

Steenis and Krueger, "Water Treeing in Polyethylene Cables," IEEE Transactions on Electrical Insulation, vol. 25, No. 5, Oct. 1990.

T. Van Horn, UTILX Letter, 10073-0013/SL052780 008.DOC, Kent, WA, www.cablesecure.com, Nov. 7, 2005, 7 pages.

* cited by examiner

FINITE VOLUME MASS FLUX (CALCULATION OVERVIEW)

METHOD FOR EXTENDING LONG-TERM ELECTRICAL POWER CABLE PERFORMANCE

CROSS REFERENCE TO RELATED APPLICATION(S)

This application claims priority benefit of U.S. patent application Ser. No. 11/468,274 filed Aug. 29, 2006, now U.S. Pat. No. 7,658,808, which claims benefit of provisional application Ser. No. 60/712,309 filed Aug. 30, 2005 and Ser. No. 60/712,944 filed Aug. 30, 2005.

FIELD OF THE INVENTION

The present invention relates to a method for extending the longevity of an electrical power cable. More particularly, the invention relates to an improved method for imparting excellent long-term dielectric performance to an in-service electrical cable section wherein a dielectric enhancing fluid composition is injected into the interstitial void volume of the cable.

BACKGROUND OF THE PRESENT METHOD

Extensive networks of underground electrical cables are in place in many parts of the industrialized world. Such underground distribution offers great advantage over conventional overhead lines in that it is not subject to wind, ice or lightning damage and is thus viewed as a reliable means for delivering electrical power without obstructing the surrounding landscape, the latter feature being particularly appreciated in suburban and urban settings. Unfortunately, these cables (which generally comprise a stranded conductor surrounded by a semi-conducting conductor shield, a polymeric insulation jacket, and an insulation shield), particularly those installed prior to 1985, often suffer premature breakdown and do not attain their originally anticipated longevity of 30 to 40 years. Their dielectric breakdown is generally attributed to so-called "treeing" phenomena (i.e., formation of microscopic voids or branching channels within the insulation material, from which the descriptive terminology derives), which lead to a progressive degradation of the cable's insulation. Since replacing a failed section of underground cable can be a very expensive and involved procedure, there is a strong motivation on the part of the electrical utility industry to extend the useful life of existing underground cables in a cost-effective manner.

A typical method for rejuvenating in-service cables comprises introducing a tree retardant fluid into the void space (interstitial void volume) associated with the strand conductor geometry. This fluid, which diffuses into the insulation and fills the microscopic trees to augment the service life of the cable, is generally selected from a particular class of aromatic alkoxysilanes which can polymerize within the cable's interstitial void volume, as well as within the water tree voids in the insulation (Vincent et al. in U.S. Pat. No. 4,766,011). This method and variations thereof employing certain rapidly diffusing components (U.S. Pat. Nos. 5,372,840 and 5,372,841) have enjoyed commercial success over the last decade or so. However, all of the current methods known to applicants still do not deliver the full potential of insulation longevity. This is very likely due to the diffusion of most of the currently used fluids out of the cable within 10 to 15 years after treatment, thereby again exposing the cable to the above mentioned treeing phenomena (e.g., see Bertini, "Accelerated Aging of Rejuvenated Cables—Part I", ICC, Sub. A, Apr. 19, 2005). Thus, there is a continued desire on the part of the utility industry to further extend the reliable performance of treated cable, thereby improving efficiency and reducing operating costs.

SUMMARY OF THE METHOD

The instant method relates to a method for extending the useful life of at least one in-service electrical cable section having a stranded conductor surrounded by a conductor shield encased in a polymeric insulation jacket and having an interstitial void volume in the region of the conductor, the cable section having an average operating temperature T. The method comprises: injecting a dielectric enhancement fluid composition into the interstitial void volume, said composition comprising at least one component selected from (1) a water-reactive material selected from
  (i) an organosilane monomer having at least two water-reactive groups,
  (ii) the above organosilane monomer (i) wherein at least one of the water-reactive groups has been substituted with a condensable silanol group,
  (iii) an oligomer of the above organosilane monomer (i), or
  (iv) a co-oligomer of the above organosilane monomer (i), said organosilane monomer (i) having a diffusion coefficient at least about 15 times greater than the diffusion coefficient of its corresponding tetramer, the diffusion coefficient being determined at temperature T;

(2) a water-reactive material selected from
  (i) an organosilane monomer having at least two water-reactive groups,
  (ii) the above organosilane monomer (i) wherein at least one of the water-reactive groups has been substituted with a condensable silanol group,
  (iii) an oligomer of the above organosilane monomer (i), or
  (iv) a co-oligomer of the above organosilane monomer (i), said water-reactive material (2) having at least one group attached to silicon comprising 7 to about 20 —$CH_2$— units;

(3) a non-water-reactive organic material which has a diffusion coefficient of less than about $10^{-9}$ $cm^2$/sec and an equilibrium concentration of at least about 0.005 gm/$cm^3$ in said polymeric insulation, the diffusion coefficient and the equilibrium concentration being determined at temperature T; or (4) an organic compound having an equilibrium concentration in the polymeric insulation at 55° C. which is less than 2.25 times the equilibrium concentration at 22° C.

Further, the instant method uses a computer simulation method to determine a flux-weighted temperature of a cable section experiencing a fluctuating load, defined infra, which may be used to assess diffusion and solubility of components being used to treat the cable, the latter calculated temperature resulting in better prediction of ultimate cable performance than the above recited average operating temperature T.

The above method may also be practiced by injecting the fluid into the interstitial void volume of a cable and confining it therein at an elevated pressure.

DETAILED DESCRIPTION OF THE PRESENT METHOD

Computer Simulation Method

Figure 1:
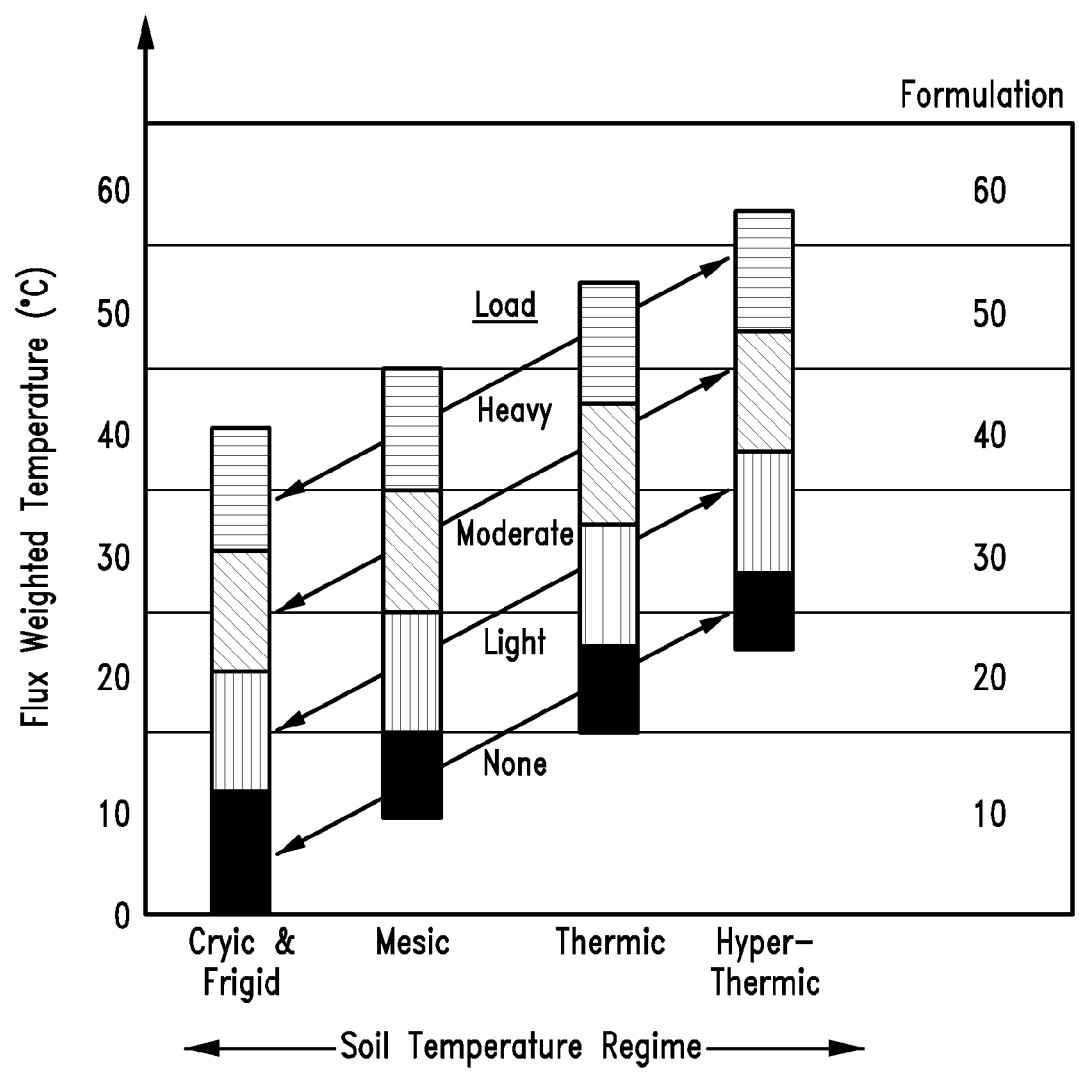
FIG. 1 is a plot of cable thermal classifications.

One embodiment of the present method for extending long-term electrical power cable performance employs a computer simulation method to determine the flux-weighted temperature for an in-service cable section, as defined below. The latter temperature is used to define solubility and diffusivity properties of component fluids according to the instant cable restoration method, as further described below. This computer simulation method is first described, as follows.

The computer simulation method can be used to predict the concentration profile for each chemical species of interest present at a given time after injecting a dielectric enhancement fluid, or fluid composition, into the interstitial void volume of an in-service electrical power cable according to the above described methods (herein referred to as "low-pressure" restoration methods). Chemical species of interest include water, all components which were originally present in the injected dielectric enhancement fluid, and reaction products thereof, including by-products such as methanol or ethanol (i.e., byproducts of reaction of alkoxysilanes typically used in such cable restoration with adventitious water). The concentration profile, in turn, can be used to predict the alternating current breakdown (ACBD) performance or reliability of a given cable section after it has been treated. The computer simulation provides the following benefits and can be applied in five modes:

R&D Mode

The performance of a dielectric enhancement fluid used to treat cables can be predicted for various cable geometries and operating assumptions knowing only the physical properties of the fluid. Formulation variations can be virtually tested to optimize performance without the usual cost and time associated with electrical aging experiments. Contrary to the above described determination of treatment efficacy, the instant simulation method requires only the gathering of various physical properties and employs a subsequent computer simulation to predict component performance, either alone or as part of a mixture. Such virtual experiments offer the benefit that many materials can be tested and optimized before an actual fluid formulation is chosen. Additionally, this optimization can be performed at any granularity, from an individual cable to classes of cables.

Regime Delineation Mode

One shortcoming of previous art methods, such as those described in U.S. Pat. Nos. 5,372,840 and 5,372,841 which rely on diffusivity measurements at 50° C., is the reliance on delineating certain classes of materials by physical properties (particularly diffusion and equilibrium concentration) at specific temperatures. Since cables operate at various temperature conditions depending upon, among other things, the temperature of the soils in which they are buried and the cycling load they carry, using a single arbitrary temperature to delineate the properties of materials is, at best, a compromise in precision and, at worst, an oversimplification which can distort reality to an unacceptable extent. To refine these classes, it is necessary to consider more than a single temperature. Further, it is only possible to adequately delineate the classes of dielectric enhancement fluid to be used for very long-term performance improvement (e.g., the slow to diffuse fluids described in Publication No. US 2005/0189130 and Publication No. US 2005/0192708) by first using the computer simulation to provide a framework for the classification of material properties. While there are an infinite number of possible geometry and time-dependent temperature profiles, the instant simulation allows this to be reduced to a manageable number which covers the majority of real world cases. The results of such simulations can then be used to select the types and amounts of dielectric enhancing fluid components which, when injected into an in-service cable, provide predictable dielectric breakdown performance for decades under the given operating conditions. These general cases can then be used in R&D mode, above, to test specific fluids within the case. In this mode, the simulation method permits one skilled in the art to reliably predict this performance without resorting to accelerated testing on actual cables, thereby saving both time and money. Moreover, while providing a good approximation of performance in view of the great complexity of the variables involved, the instant simulation method is believed to be superior to the current accelerated aging test method in predicting long-term post-treatment field reliability. Furthermore, as the amount of data increases over time (particularly field performance data) the statistical reliability of the instant simulation method will correspondingly improve.

Marketing Mode

The instant simulation method can be used to predict the reliability performance of competitive products, thereby strengthening marketing position of superior fluids and injection methods.

Pre-Injection Formulation Optimization Mode

With sufficient computer resources, it is possible to tailor individual formulations to customer requirements and cable conditions.

Post-Injection Performance Mode

After a cable is injected, its performance can be predicted when unforeseen changes in the operation of the cable are required or desired. As improved physical property data or improved theoretical or more useful empirical relationships become available, the performance can be reassessed to provide a refined reliable life estimate. This allows the reassessment of anticipated performance in light of new information.

Granularity

As used herein, the term "in-service" refers to a cable which has been under electrical load and exposed to the elements, usually for an extended period (e.g., 10 to 40 years). In such a cable, the electrical integrity of the cable insulation has generally deteriorated to some extent due to the formation of water or electrical trees, as well known in the art. Further, the term cable "segment," as used herein, refers to the section of cable between two terminal connectors, while a cable "sub-segment" is defined as a physical length of uninterrupted (i.e., uncut) cable extending between the two ends thereof. Thus, a cable segment is identical with a sub-segment when no splices are present between two connectors. Otherwise, a sub-segment can exist between a terminal connector and a splice connector or between two splice connectors, and a cable segment can comprise one or more sub-segments. The computer simulation method and the instant method for extending long-term cable performance apply equally to a segment and a sub-segment. For the sake of efficiency, the term "cable section" will be used herein to designate either a cable segment or a cable sub-segment while the specific terms will be applied as appropriate.

For each of the above five modes it is possible to use any level of granularity (i.e., the agglomeration of discrete cable lengths subjected to the computer simulation as a single integral unit), from that of an individual sub-segment of cable to entire classes of cables. Cables may be classified into groups by their geometry (i.e. conductor size, conductor compression, thickness of polymeric layers, presence or absence of an outer protective jacket, etc.), their materials (i.e. XLPE, HMWPE, EPR, etc.) and/or by their foreseeable dynamic temperature profiles. Consider the following examples which provide illustrations of some of the possible levels, from the smallest practical level of granularity to the greatest:

- A 25-foot cable sub-segment which runs under an asphalt roadway. The soil around the cable is warmer due to absorption of more solar energy and hence the rate of fluid exudation from this sub-segment is higher than for the rest of the segment.
- A single cable segment. While all the segments in a circuit are electrically connected in an ostensibly series arrangement, load decreases in segments which are remote from the source of power because current is drained off from each transformer in the series and from losses due to circuit impedance. Hence the cable nearest the source caries the greatest load and the cable farthest from the source carries the lowest load. A cable terminated on a stand-off bushing at the loop normally-open point has no load. As a consequence, the operating temperature of the remote segment is likely lower than that of a segment close to the power source.
- 3 segments of cable in a 3-phase circuit having a balanced load.
- A circuit (half loop or radial feed) wherein are all of the cables have the same geometry and materials of construction.
- A class of cables which have generally the same geometry and materials of construction and roughly the same thermal profile. One such useful thermal classification system is illustrated in FIG. 1.

Thermal Classifications of Cable Operation

Over 90% of underground cables in the world are buried in soils which have mean annual temperature ranges that can be conveniently grouped into the four soil regimes shown in the table below. It should be noted that, although the cable depth is typically 1 meter, these soil temperature regimes are defined by soil scientists at a depth of 0.5 meter.

| Cryic (or frigid) soil | 0-10° C. |
|---|---|
| Mesic soil | 8-15° C. |
| Thermic soil | 12-22° C. |
| Hyperthermic soil | 22-28° C. |

Further, many cables may be buried at depths other than 1 meter and correction to the temperature for such a cable depth may be required. That is, the soil temperature at cable depths other than 0.5 meters need to be corrected from the temperatures listed above and such corrections are well known in the art. Moreover, cables buried in these various thermal regimes can carry loads from zero (e.g., backup cables or radial feeds far from the power source) up to the maximum design capacity of the cable. For most cables, the maximum conductor design temperature is 90° C. but, for the purposes of the instant simulation method, it is useful to consider three ranges of flux-weighted temperature (defined infra) increase above the ambient soil temperatures, as follows:

| lightly loaded | <10° C. |
|---|---|
| moderately loaded | 10-20° C. |
| heavily loaded | >20° C. |

For the above four soil temperature regimes and three load conditions there would be 12 possible combinations, including some overlap, as shown schematically in FIG. 1. It would therefore be more convenient to formulate a smaller number of treatment regimes based on the flux-weighted temperature. For example, in FIG. 1, six formulations are selected, each formulation (numbered 10 to 60 at the right side of this figure) is a mixture including an extremely slow to diffuse component, a moderately diffusing component and, optionally, a fast to diffuse component which together in different ratios adequately covers the thermal ranges depicted in FIG. 1. Such specific catalyzed formulations are illustrated in Table 1, below, wherein catalytic amounts of tetraisopropyl titanate (TIPT) are used in proportion to the total amount of alkoxysilanes in a given formulation. In general, as the temperature rises, the amount of slow flux components (i.e., low diffusion coefficients and/or low equilibrium concentration in the cable insulation) is increased at the expense of the materials which exhibit higher flux, wherein "flux" refers to a radial mass transfer rate through the cable per unit length thereof.

TABLE 1

| Component | Formulation Number and Component Weight % | | | | | |
|---|---|---|---|---|---|---|
| | 10 | 20 | 30 | 40 | 50 | 60 |
| acetophenone | 18.00% | 15.00% | 12.00% | 9.00% | 6.00% | 3.00% |
| tolylethylmethyl-dimethyloxysilane | 58.00% | 53.00% | 48.00% | 43.00% | 38.00% | 33.00% |
| 2-cyanobutyl-methyldimethoxy-silane | 4.03% | 12.00% | 19.97% | 27.94% | 35.91% | 43.88% |
| menthylanthranilate | 0.64% | 0.64% | 0.64% | 0.64% | 0.64% | 0.64% |
| avobenzone | 2.40% | 2.40% | 2.40% | 2.40% | 2.40% | 2.40% |
| octocrylene | 9.60% | 9.60% | 9.60% | 9.60% | 9.60% | 9.60% |
| ferrocene | 6.70% | 6.70% | 6.70% | 6.70% | 6.70% | 6.70% |
| TIPT | 0.63% | 0.66% | 0.69% | 0.72% | 0.75% | 0.78% |
| total | 100.00% | 100.00% | 100.00% | 100.00% | 100.00% | 100.00% |

The Instant Method Computer Simulation

Figure 2:
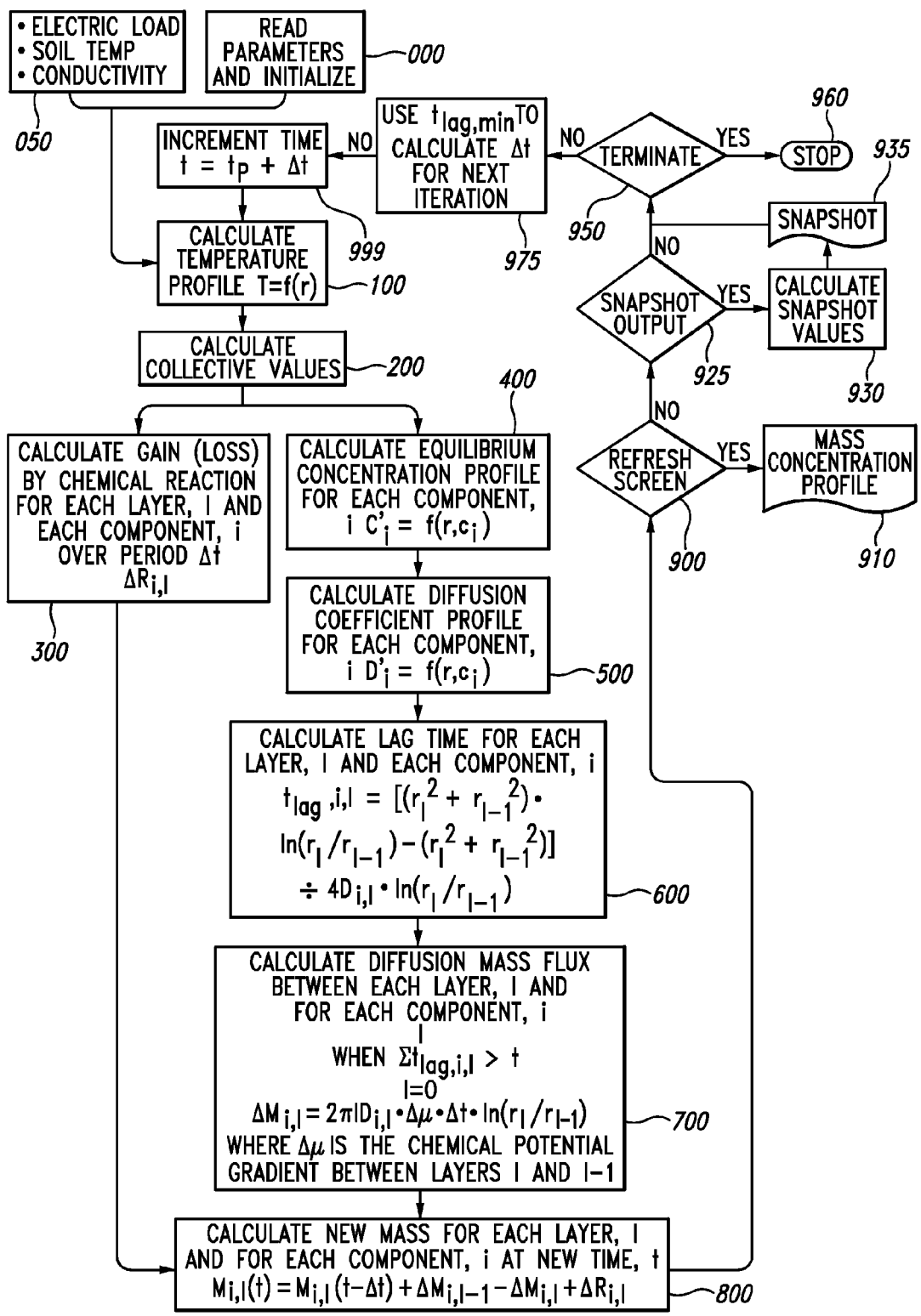
FIG. 2 is a schematic overview of the finite volume mass flux computer simulation.

FIG. 2 provides a schematic overview of a computational loop which is repeated for each time increment, $\Delta t$, until the desired simulation period ends. Each box of FIG. 2 has a 3-digit code which relates to a corresponding section of this disclosure and a step in performing the computer simulation, below. Each section, in turn, provides an overview of the calculations that are represented by the box.

Figure 3:
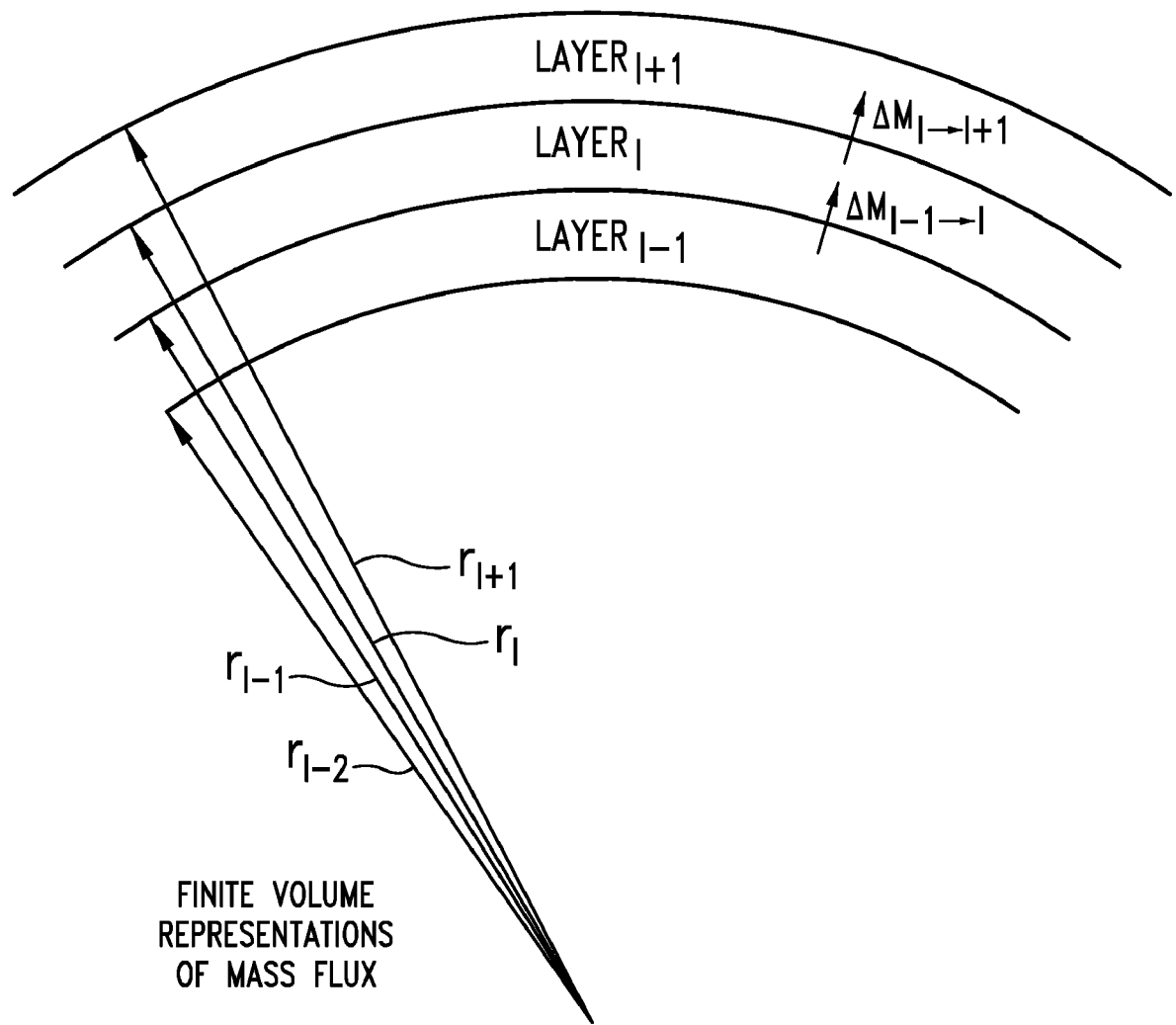
FIG. 3 is a finite volume representation of mass flux.

In the simulation, finite volumes are defined by coaxial cylinders stretching the length of the simulated cable segment or sub-segment. (Note: The singular exception to this cylindrical geometry is the innermost layer of the conductor shield which will be discussed in detail later and referred to as "layer zero" or Layer$_0$). Other than the innermost volume, the finite volumes are in the shape of coaxial annular bands or layers, or as used herein annular cylinders or simply "cylinders". Referring to FIG. 3, the cylinder corresponding to Layer$_i$ is defined by an inner radius $r_{i-1}$ and an outer radius $r_i$. As the number of layers or volume elements increases, the accuracy and the precision both increase at the expense of the computational power required to perform the simulation. In practice, a compromise is made between simulation resolution and the length of time required to perform the simulation.

Section 000

This section of the simulation allows the user to provide physical and geometric inputs to the simulation, including:
- Time considerations, including the simulated length of the simulation, the date and time for the start of the simulation, the frequency at which data should be retained from the simulation for post-simulation analysis.
- The geometry and materials of construction of the cable
- The electric field distribution of the cable in kV/mm across the dielectric, which is easily calculated given the cable geometry and the operating voltage in kV. The electrical field affects the equilibrium concentration of polar materials in solid dielectrics, as predicted by the Clausius-Clapeyron equation. (See Soma & Kuma, "Development of bow-tie tree inhibitor," IEEE 1990.) The injection pressure, and where a soak is used, the soak pressure and the soak duration.
- The total quantity and composition of material supplied to the interstitial void volume. Note that the total quantity can generally be estimated from the actual pressure used and such an estimate will generally suffice. However, when actual quantities of fluid injected are measured, those measurements should be utilized.

The physical properties of each component in the dielectric enhancement fluid, along with water and products and by-products of chemical reactions including:
- Diffusion parameters, which allow the calculation of coefficients within each layer of the cable, within the temperature ranges of the simulation and within the concentration ranges of the simulation.
- Equilibrium concentration parameters of the components, which allow the calculation of coefficients within each layer of the cable, within the temperature ranges of the simulation, within the concentration ranges of the simulation, including binary interactions between components, and within any dielectric layers wherein the equilibrium concentration is influenced by an AC electrical field (i.e., equilibrium concentration for any molecule with a non-zero dipole moment).
- Molecular weight of the components (needed for chemical reaction molar balance calculations)
- Density of the components (needed to calculate pressure in the interstitial void volume of the cable).

The approximate seasonal water concentration in the soil is generally obtained from historical data. These historical-based predictions can be refined by climate modeling and micro-climate modeling when the cable transfers substantial energy into the soil. The U.S. Department of Agriculture provides this kind of data at their web site: www.wcc.nres.usda.gov/scan/. Ampacity calculations take the water content of the soil into account for accurate predictions as the water content has a significant effect on soil thermal conductivity.

Chemical reaction parameters including:
- Identification of the stoichiometry of all significant chemical reactions, including those involving any catalyst incorporated
- Reaction rate parameters
  - Frequency factor
  - Activation energy The void volume distribution or "halo" (further described below) within the dielectric layer of the cable. The halo can be measured by saturating a cable sample with a fluid and quantifying the concentration profile of the fluid across the radius of the insulation. The profile (i.e., a value over a distance (radius)) of the total water concentration minus the equilibrium water concentration in un-haloed polymer divided by the water density yields the halo profile (the profile is measured experimentally or generalized from data available in the literature).

Section 050

In this section, parameters which affect the operating temperature of the cable are entered. The user must provide temperature and thermal property inputs, each as a function of time over the lifetime of the simulation. At a minimum these inputs include the load in amperes, the soil temperature at cable depth (away from the heating influence of the cable), and the thermal conductivity of the soil. Examples of additional variables which may influence results and may be included as refinements where the effects are significant, include local conditions such as: 1) the layout of multi-phase circuits where the heat output of individual cables impacts the temperature of the soil surrounding adjacent cables, and 2) other sources of heat such as buried steam pipes. These inputs are used, along with the cable geometry and cable materials of construction, to provide the temperature at any radius (r) within the cable profile and at any time (t) over the anticipated post-treatment life using methods well known in the art. See for example, http://www.cyme.com/software/cymcap/.

Section 100

Figure 5:
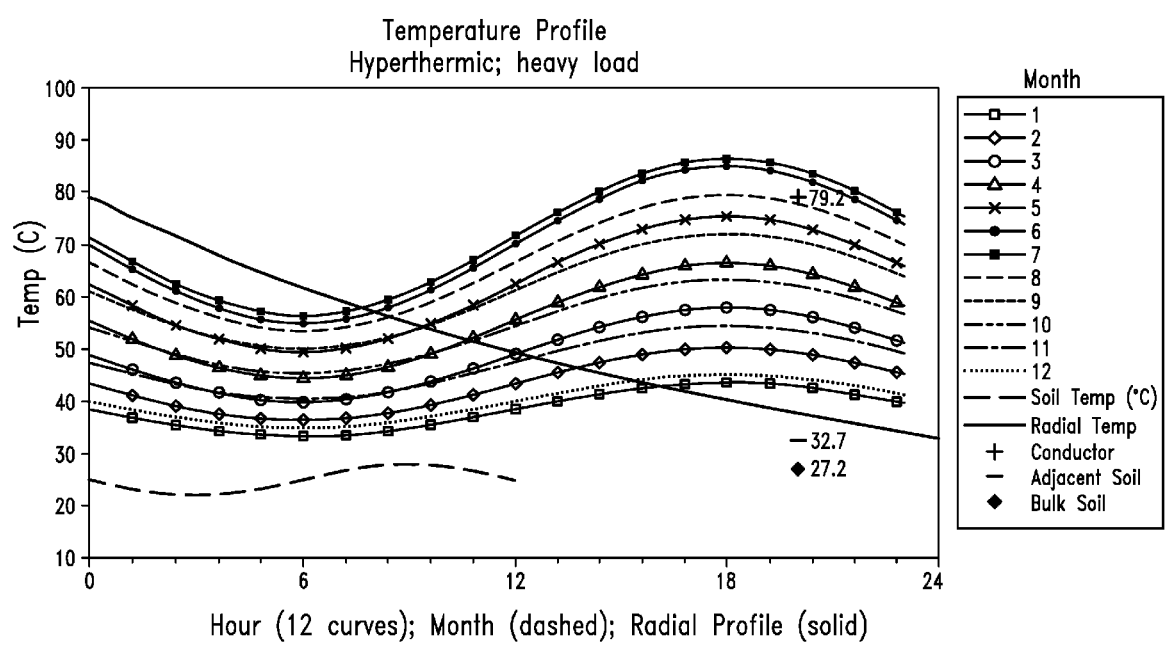
FIG. 5 is a plot of the temperature fluctuations typical of a heavily loaded cable in a hyperthermic soil.

Using the parameters entered in Section 000 and 050, this section calculates the dynamic radial temperature profile for each finite volume layer. If it is desired to model a specific case, then the radial temperature profile as a function of time is available from finite element calculations, such as those described in Section 050, above, or calculated by software available at http://www.cyme.com/software/cymcap/. Alternatively, since it makes little sense to employ computationally intensive finite element modeling methods to model general cases, a simplified model of temperature fluctuations may be used as a representation of general cases. FIG. 5 is just such a representation of a typical heavily loaded cable in a hyperthermic soil. A specific case would include planned loading profiles, for example a feed to a chemical plant might have an almost constant load, except during the annual 2 week maintenance shut-down. This is differentiated from a general case which exhibits a typical and generally sinusoidal temperature profile, as shown in FIG. 5.

Section 200

Using the parameters entered in Section 000 and 050 and the calculations in Section 100 and the conditions from the previous iteration of the loop, this section:

Calculates the collective values solute mass and total mass for each finite volume layer by summing the mass of each component of the dielectric enhancement material.

Calculates the approximate interstitial volume actually filled with material by dividing the total mass of material in the interstices by the sum of the products of each component density and its respective mass fraction.

Calculates the concentration of each component of the fluid in terms of mass per unit volume.

Calculates the pressure of the remaining mass in the interstices as the various components of the dielectric enhancement fluid diffuse into the insulation jacket where there is no soak bottle attached to the cable. A good approximation can be obtained with a linear pressure decrease from the initial pressure to zero as the mass decreases from its original mass to the mass which can fit without any pressure in the interstitial space.

Determines whether the pressure in the interstices is sufficiently high that a "layer zero" (See Layer$_0$ in FIG. 4) zero-by-pass condition exists (i.e. the pressure is high enough that fluid flows along the outer circumference of the outer strands and effectively can permeate directly into Layer$_1$). Layer zero is the portion of the conductor shield which is extruded between the outermost strands of the conductor strand bundle. When interstitial pressures are low, there is a bottleneck in mass flux between the interstices and all layers of the polymer from Layer$_0$ outward. This limited area, represented in one dimension by the smallest arc in FIG. 4 and in the other dimension by the length of the cable under consideration, is a tiny fraction of the area represented by the largest arc and the same cable length, which would be available for diffusion if Layer$_0$ were bypassed. The ratio (small to large) of these two areas is the L$_0$ restriction.

Section 300

Using the parameters entered in Section 000 and 050 and the calculations from 100 and 200, this section:

Calculates the change in mass resulting from all significant chemical reactions, including the parallel reaction routes which result from the presence of catalysts, for each finite volume element and for each component of the dielectric enhancement fluid.

Converts all concentrations to molar concentrations (g-moles/cm$^3$).

For a typical hydrolysis or condensation reaction of A+B+C→D, the rate equation is $$-r_A = k C_A C_B C_C$$

wherein $C_A$, $C_B$, $C_c$ denote the molar concentrations of components A and B and catalyst C, respectively, k is a rate constant and $r_A$ is rate of the reaction of component A. The rate constant is, in turn, a function of temperature:

$$k = k_0 e^{-E/RT}$$

where $k_0$ is the frequency factor, E is the activation energy, R is the ideal gas constant, and T is the absolute temperature. The chemical reaction rate equations for each reactive component are solved simultaneously and the form of the equation may vary from the above example. Not to be confused with the ideal gas constant R just described, $\Delta R_{i,l}$ is the net change in mass of each component, i, within each finite volume element, l. This net change in mass from chemical reaction is next used in Section 800, as described below.

Section 400

Using the parameters from 000 and 050 and the calculations from Section 100 and 200, this section calculates the equilibrium concentration profile for each component of the dielectric enhancement fluid within each layer at the given simulation time. The equilibrium concentrations are determined in three steps and incorporate the following considerations: (1) pure component equilibrium concentration, including the effect of the electrical field, as predicted by the Clausius-Clapeyron equation of phase transition, (2) effect of component interactions, and (3) the effect of the halo within the insulation.

Pure Component Equilibrium Concentration

Utilizing an Arrhenius exponential function, or any empirical function that has been fitted to the data over the temperature range of interest, the pure component equilibrium concentration, $C_i$, as a function of temperature for each component and in each finite volume element, is determined. Not only does the pure component equilibrium concentration vary with temperature, but it varies with the composition of the material of the respective finite volume. Thus, separate functions are required for each of the following layers, if present, in the cable construction: conductor shield, insulation jacket, insulation shield, and jacket material(s). The only layer that supports a significant electrical field is the insulation layer and an adjustment to the pure component equilibrium concentration should be made. This adjustment can be accomplished either with experimental measurements fitted to an empirical function or, where relative permittivity values of the component in the liquid and vapor phases and the permittivity of the insulation are known, the Clausius-Clapeyron formula can be used to provide estimated adjustments. The solubility increases for high dielectric constant (DK) materials in higher electrical fields are shown by Soma & Kuma, "Development of bow-tie tree inhibitor," IEEE 1990.

Component Equilibrium Concentration with Component Interactions

Figure 9:
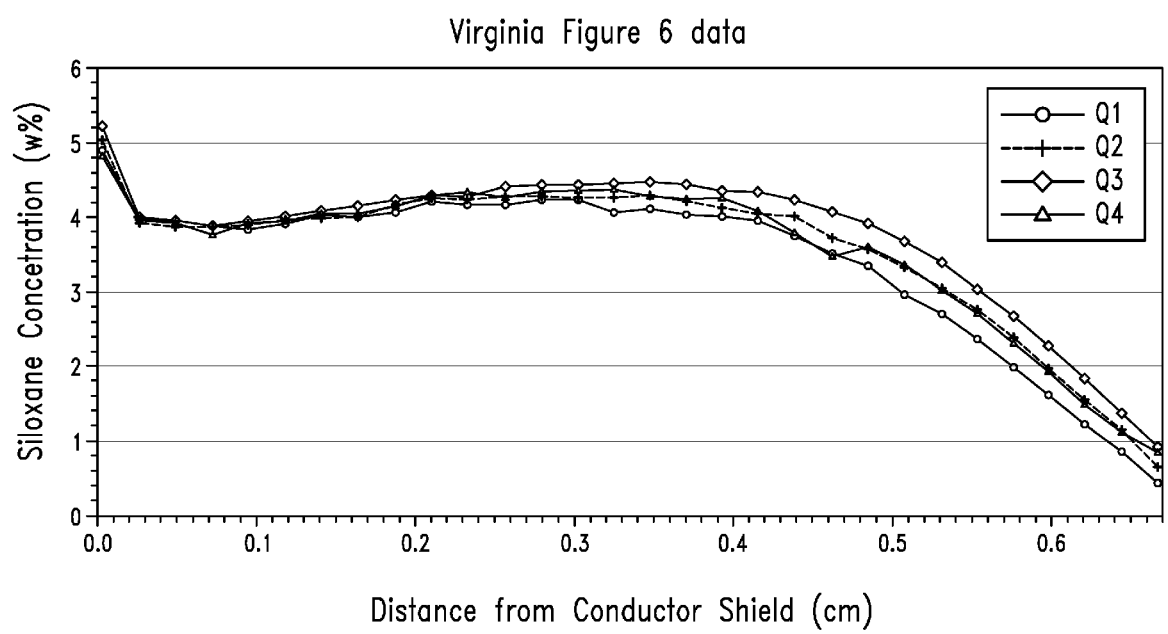
FIG. 9 is a plot of published data for Virginia Power energized but unloaded 35 kV, 1000 kcmil cable 15 months post-treatment ("Cable fault prevention using dielectric enhancement technology," Mokry et al, Jicable 1995).
Figure 10:
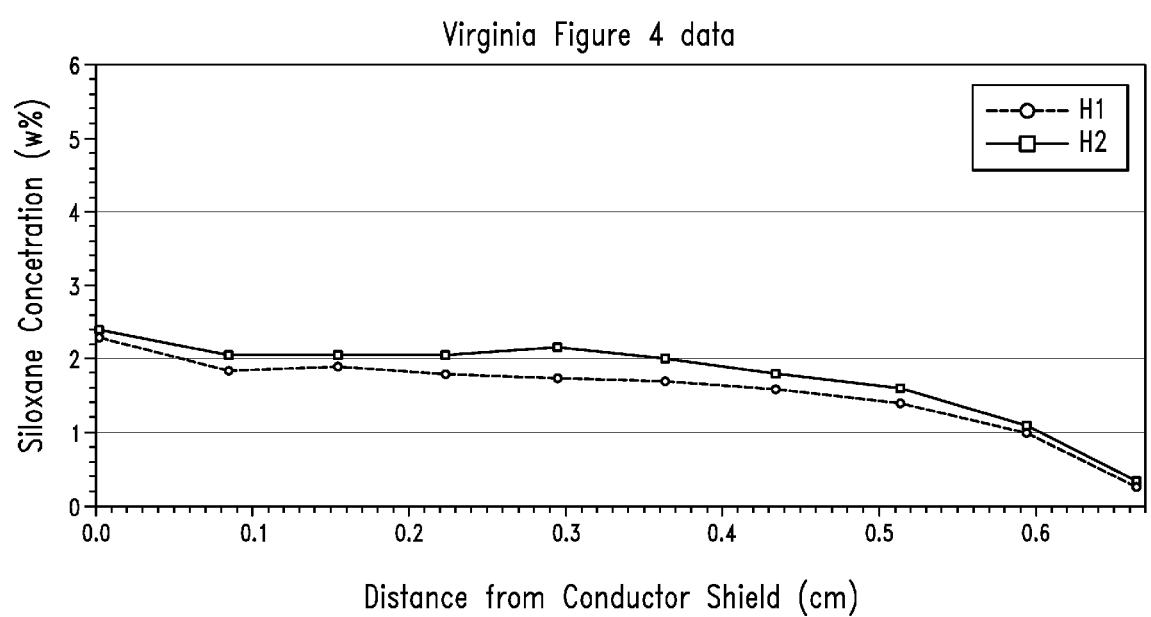
FIG. 10 is a plot of published data for Virginia Power energized but unloaded 35 kV, 1000 kcmil cable 70 months post-treatment ("Fourth Generation Dielectric Enhancement Technology," Jenkins & Bertini, Jicable 1998).

The equilibrium concentration of any individual component in a polymer phase is impacted by the presence of other components dissolved in the polymer phase. A variety of mathematical methods may be utilized to model the component interactions. One useful model is provided below to illustrate the concept. The component (i) equilibrium concentration, which is adjusted for the presence of other components, is denoted by $C'_i$. For the interstices, there is no interaction with a polymer, so $C'_i$ equals $C_i$. For all polymeric or rubber layers:

$$C'_{i,l} = C_{i,l} \cdot \frac{m_{i,l} \text{ (for component } i \text{ \& layer } l)}{\Sigma m_{i,l} \text{ (for all components } i \text{ \& layer } l)} \alpha_i$$

wherein m is the mass in grams and alpha ($\alpha_i$) is an empirical coefficient having a value between 0 and 1 which models the departure from ideal solution behavior. This empirical coefficient can be determined experimentally in at least two ways. In the first, experimental data, as described below in "Example of the instant simulation method in a Marketing Mode," is utilized to adjust the $\alpha_i$ function to fit data such as those shown in FIG. 9. In the second, polymer slabs can be exposed to known quantities of material pairs. The slabs can be sacrificed and the concentration of the binary pairs can be quantified. With all values directly measurable except $\alpha_i$, the latter constant can be calculated directly for the component pair. For the materials and temperature ranges of interest, the total component equilibrium concentration in any polymer layer remains relatively low (i.e., the total concentration is typically below 0.1 g/cm$^3$). For most systems, the interactions of component pairs in such dilute polymer solutions can be adequately modeled using only the binary interactions of solute components. The dilute nature of the solution allows tertiary and higher interactions to be ignored without significant impact on the accuracy of the calculations. However, where higher-order interactions are significant, they can likewise be measured, albeit with a large number of experiments.

Figure 13:
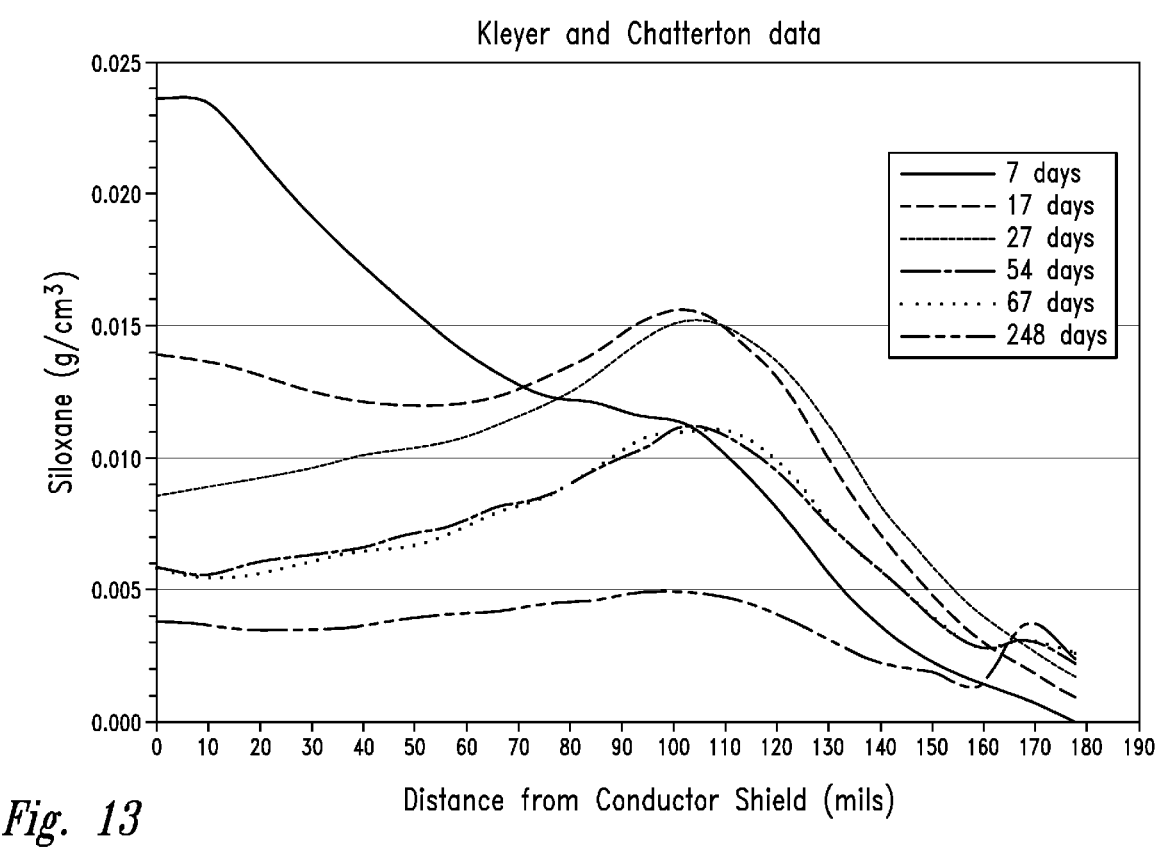
FIG. 13 is a plot of siloxane concentration as a function of radial position in a cable (digitized data from Kleyer & Chatterton).
Figure 14:
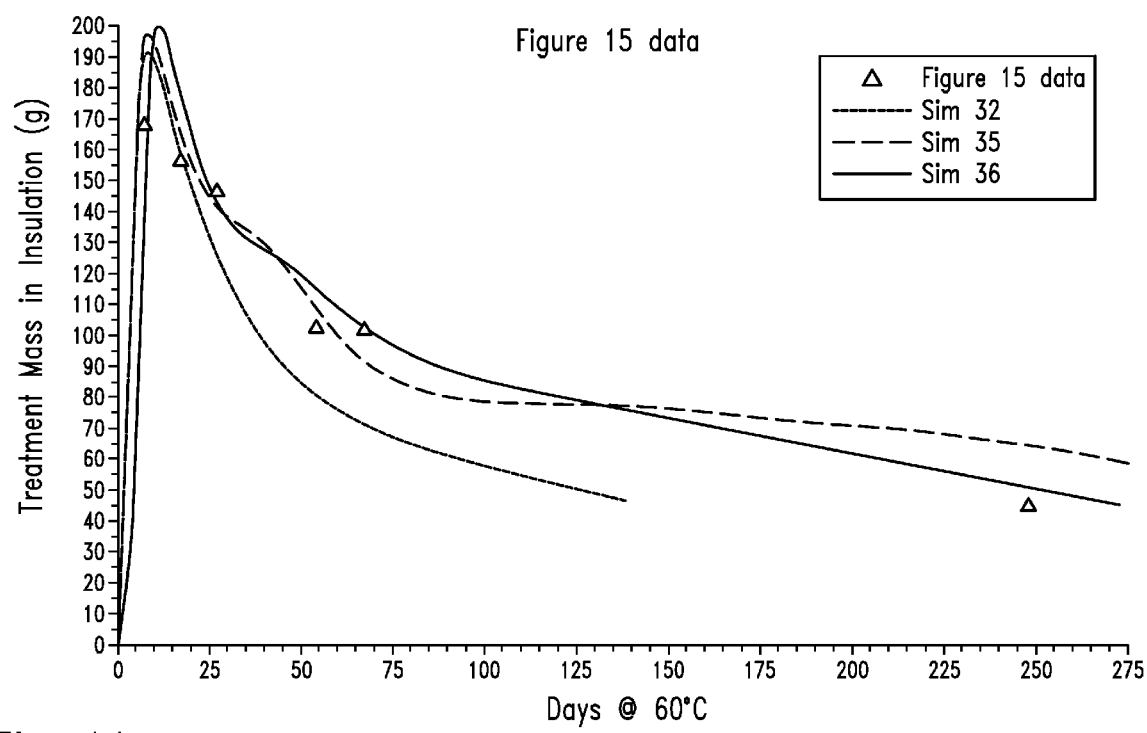
FIG. 14 is a plot of the total fluid mass in the insulation as a function of time (as reported by Kleyer & Chatterton).

Component Equilibrium Concentration with Fluid Interactions Plus Halo in Insulation A halo is a dispersion of micro voids in the dielectric material (i.e., the insulation) and is generally caused by repeated thermal cycling while the material is saturated with water. Current in a cable generally cycles over a 24 hour period between maximum and minimum values. As a consequence, the temperature of the cable cycles with the same frequency. The equilibrium concentration of water in the dielectric is a strong function of temperature and, as the temperature increases, more water permeates into the cable. As the temperature decreases, the water attempts to retreat from the cable, but it cannot do so fast enough to avoid supersaturation, particularly near the middle of the insulation layer. The water condenses out of the polymer phase and forms water-filled micro voids. The volume of halo micro voids in each finite volume element, $H_l$, forms an approximately normal distribution which can be fit to comport with measured values obtained with a micro infrared scan of the wet insulation or a Karl-Fischer titration thereof. Each component of the dielectric enhancement materials, water and any products or by-products of their chemical reactions in the void volume of the halo is in dynamic equilibrium with the same component in the polymer matrix. The component distribution in the halo is proportional to the actual amount of component in the finite volume element and the equilibrium concentrations of those components in the finite volume element. The halo adjusted equilibrium concentration, $C''_{i,l}$, is:

$$C''_{i,l} = C'_{i,l} + H_l \cdot [\omega \cdot C'_{i,l}/\Sigma C'_{i,l} + (1-\omega) \cdot m_{i,l}/\Sigma m_{i,l}]$$

wherein ω (omega) is an empirical weighting factor with a value between 0 and 1 which is adjusted to fit experimental data of the type provided in FIGS. 13 and 14.

Section 500

Using the parameters input in Sections 000 and 050 and the calculations from Sections 100, 200, and 400, this section calculates the diffusion coefficient profile, $D_{i,l}$, of each component, i, and for each finite volume layer, l, as a function of temperature and concentration. There are a number of suitable empirical relationships to accommodate the temperature and concentration dependence of diffusion, the equation below being illustrative:

$$D_{i,l} = A_i \cdot 10^{-Q_i/T_l} \cdot e^{\xi_i \cdot \Sigma X_{i,l}}$$

wherein $A_i$ and $Q_i$ are empirical constants for component (i) which reflect the change in diffusion with temperature at infinite dilution, $\xi_i$ is an empirical constant for component i which reflects the concentration dependence, $\Sigma X_{i,l}$ is the concentration of all solute components (i=1–n, where n is the number of solutes) in element l, and $T_l$ is the absolute temperature of finite element, l. There are a wide variety of methods well known in the art to gather diffusion data at various temperatures and concentrations which can then be fitted to the above equation using a least-squares or similar regression approach. One method often employed is to immerse a slab sample of polymer in the fluid of interest at a constant temperature. The slab is periodically removed from the fluid and weighed to generate a curve of weight gain versus time. Using the formulae and method described in *Engineering Design for Plastics*, 1964, edited by Eric Baer, Chapter 9: Permeability and Chemical Resistance, equation (26) on page 616 provides that the diffusion coefficient as a function of time (t) to half saturation is: Thus, this section calculates a new D for each layer, l, and each delta-t, $$D = 0.04939/(t/\lambda^2)_{1/2}.$$

where λ is the slab sample thickness and the subscript designates the half-saturation condition.

Section 600

Using the parameters of Sections 000 and 050 and the calculations from Sections 100, 200, 400, and 500, this section calculates the lag time, $t_{lag,i,l}$, defined herein as the time it takes a molecule of a component to traverse the thickness of a given cylindrical layer, for each component, i, and each finite volume element, l, as described in Crank & Park, *Diffusion in Polymers*, p. 177 (1968), equation for "A." This expression applies to a cylinder having a single homogenous composition, as is the case for each finite volume element of the instant simulation method.

$$t_{lag,i,l} = [(r_l^2 + r_{l-1}^2) \cdot \ln(r_l/r_{l-1}) - (r_l^2 - r^{l-1 2})] \div 4D_{i,l} \ln(r_l/r_{l-1})$$

Section 700

Using the parameters of Sections 000 and 050 and the calculations from Sections 100, 200, 499, 500, and 600, this section calculates the mass flux ($\Delta M_{i,l}$) for each component, i, and between each finite volume element, l, when $$\sum_{l=0}^{l} t_{lag,i,l} > t$$

where t is the cumulative elapsed simulated time, and t is the time lag for each component, i, and within each finite volume element, l. Permeation between adjacent finite element layers can only occur where the sum of the time lag values for each component from finite volume element 0 (zero), to the outermost of the two finite volume elements, l, is greater than the elapsed simulation time, t. When the lag time constraint is satisfied, $$\Delta M_{i,l} = 2\pi L D_{i,l} \Delta \mu_l \Delta t \cdot \ln(r_l/r_{l-1})$$

where $\Delta\mu_l$ is the potential gradient in mass per unit volume, as described below, between layers l and l−1, L is the length of the cable segment or sub-segment and $\Delta t$ is the time increment for this simulation iteration loop. The potential gradient between two adjacent finite volume elements, $\Delta\mu_l$, can be approximated more than one way. An example of one approximation is provided below to illustrate the concept. For cases where $X_{i,l}/C'_{i,l} < X_{i,l+1}/C'_{i,l+1}$ $$\Delta\mu_l = X_{i,l+1} - C'_{i,l+1} \cdot X_{i,l}/C'_{i,l}$$

and where $X_{i,l}/C'_{i,l} < X_{i,l+1}/C'_{i,l+1}$ $$\Delta\mu_l = -X_{i,l} + C'_{i,l} \cdot X_{i,l+1}/C'_{i,l+1}$$

It should be noted that, within the insulation layer, C", which accommodates the halo, is substituted for equilibrium concentration C' in the four expressions above and the other symbols have their previous definitions.

Section 800

Using the parameters of Sections 000 and 050 and calculations from Sections 100, 200, 300, 400, 500, 600, and 700, this section sums the absolute mass of the previous iteration ($M_{i,l}(t-\Delta t)$) for each component, i, in each finite volume element or layer, l, with the mass flux ($\Delta M_{i,l}$) into and out of each finite volume element and the net chemical reaction, $\Delta R_{i,l}$ to yield the new absolute mass, $M_{i,l}(t)$.

$$M_{i,l}(t) = M_{i,l}(t-\Delta t) + \Delta M_{i,l-1} - \Delta M_{i,l} + \Delta R_{i,l}$$

where $M_{i,l}(t)$ represents absolute mass, t is the current elapsed simulation time, ($t-\Delta t$) is the elapsed simulation time of the previous iteration, and all of the "delta" terms represent the respective variable changes calculated over the increment $\Delta t$.

Sections 900-950

These sections control program output to a display screen as well as files and program termination when the simulation is completed.

Section 975

This section calculates the $\Delta t$ for the next iteration. In practice, the dynamics (i.e. the lag times for the fastest to diffuse components which were calculated in Section 600) of the previous iteration are used to optimize the $\Delta t$. From trial and error experience, a factor (this lag time multiplication factor may generally be as high as 3 to 10) is multiplied by the smallest lag time of the previous iteration to establish a new $\Delta t$. Too large a $\Delta t$ causes the calculation to become unstable and potentially fail; too small a $\Delta t$ while increasing accuracy and numerical stability, uses greater computational resources. Generally the most dynamic element will establish the required $\Delta t$ (i.e. the most dynamic element has the minimum $\Delta t$). To reduce the number of required calculations and to enjoy the economy of rapid computations, whole number factors can be established between the most dynamic element (very often the diffusion of water) and at least one, or even more preferably, most of the less dynamic elements. For example, if the calculated lag time for the diffusion of water in one finite element was 3 seconds and the lag time for a particular chemical reaction was 61 seconds, a whole number factor such as 20 (61÷3, rounded to a whole number) could be assigned to the chemical reaction such that the reaction equations are solved once every 20 iterations.

Section 999

This section increments the time, t by $\Delta t$ and begins another iteration loop at Section 100.

EXAMPLES

The various utilities (modes) of the above described computer simulation will now be illustrated by way of non-limiting examples to further clarify the different embodiments of the instant simulation method.

Example of the Instant Simulation Method in a Regime Delineation Mode

In the following example an embodiment of the instant simulation method is illustrated wherein the computer simulation is utilized to provide the distribution of fluid components in a cable and facilitate convenient grouping of commonly occurring cases of similar conditions, as illustrated in FIG. 1. This grouping of similar situations avoids the impracticality of dealing with the vast number of possibilities individually.

For illustrative purposes, consider a typical cable segment carrying a heavy current load in a hyperthermic soil which experiences the temperature fluctuations depicted in FIG. 5. The seasonal fluctuation of the bulk soil temperature is shown by the lower dashed sinusoidal curve as a function of time in months (ranging from 0 to 12 months on the x-axis). The upper 12 sinusoidal curves indicate the daily (0-24 hours on the x-axis) average fluctuations in conductor temperature for each of the 12 months of the year. The solid monotonically declining line describes the radial temperature profile across the cable conductor shield, insulation, and insulation shield at a particular simulated moment (e.g., 3:45 PM on Aug. 31, 2010), the corresponding abscissa being scaled such that zero represents the innermost radius of the conductor shield and 24 represents the outermost radius of the insulation shield. It is further assumed that the above cable segment is 220 feet long and is of the following construction: unjacketed; 15 kV, 100% insulation (180 mil); I/O, 19-strand, aluminum concentric conductor. The cable is injected (virtually) at time t=0 (e.g., noon; Jun. 2, 2005) with 839 grams of a two-component dielectric enhancement fluid mixture consisting essentially of 755 grams of menthylanthranilate and 84 grams of ferrocene. The mass of fluid supplied is the mass which would be supplied and confined at a pressure of 100 psig according to the method described in Publication No. US 2005/0189130, cited above.

Figure 6:
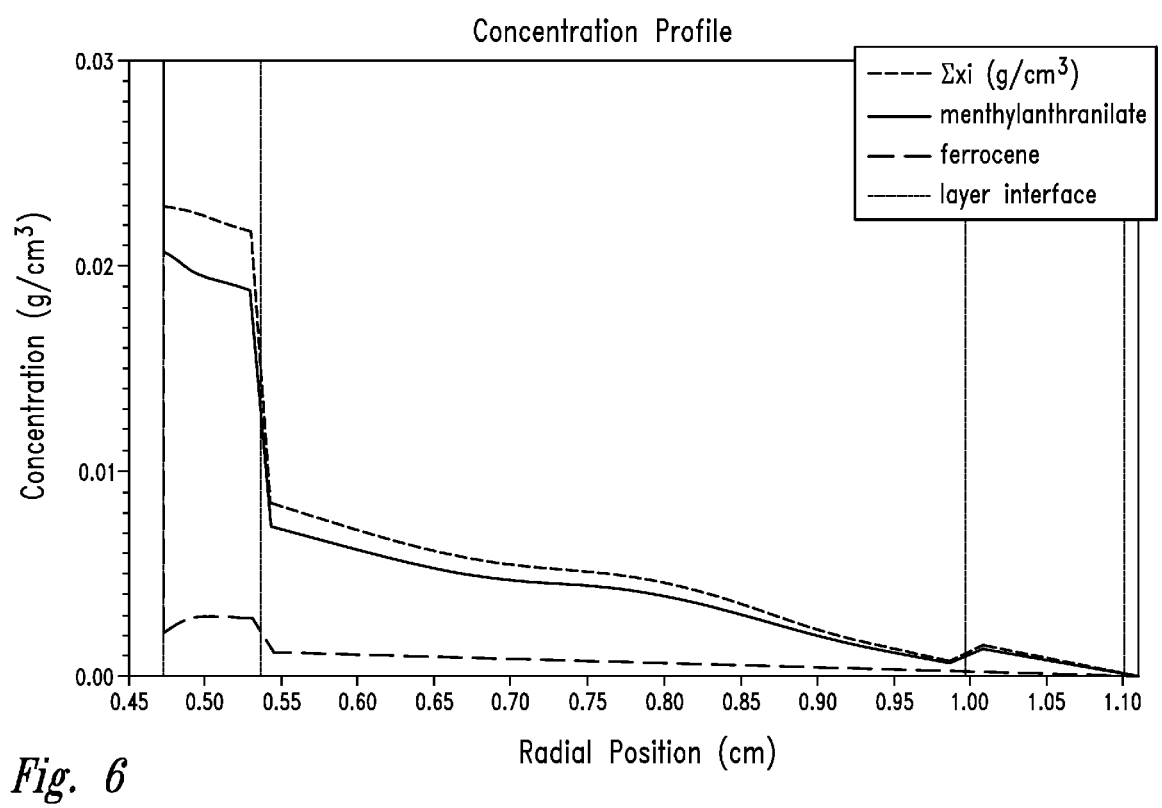
FIG. 6 is a plot of the radial concentration profile 5¼ years after treatment with a menthylanthranilate/ferrocene fluid mixture.
Figure 7:
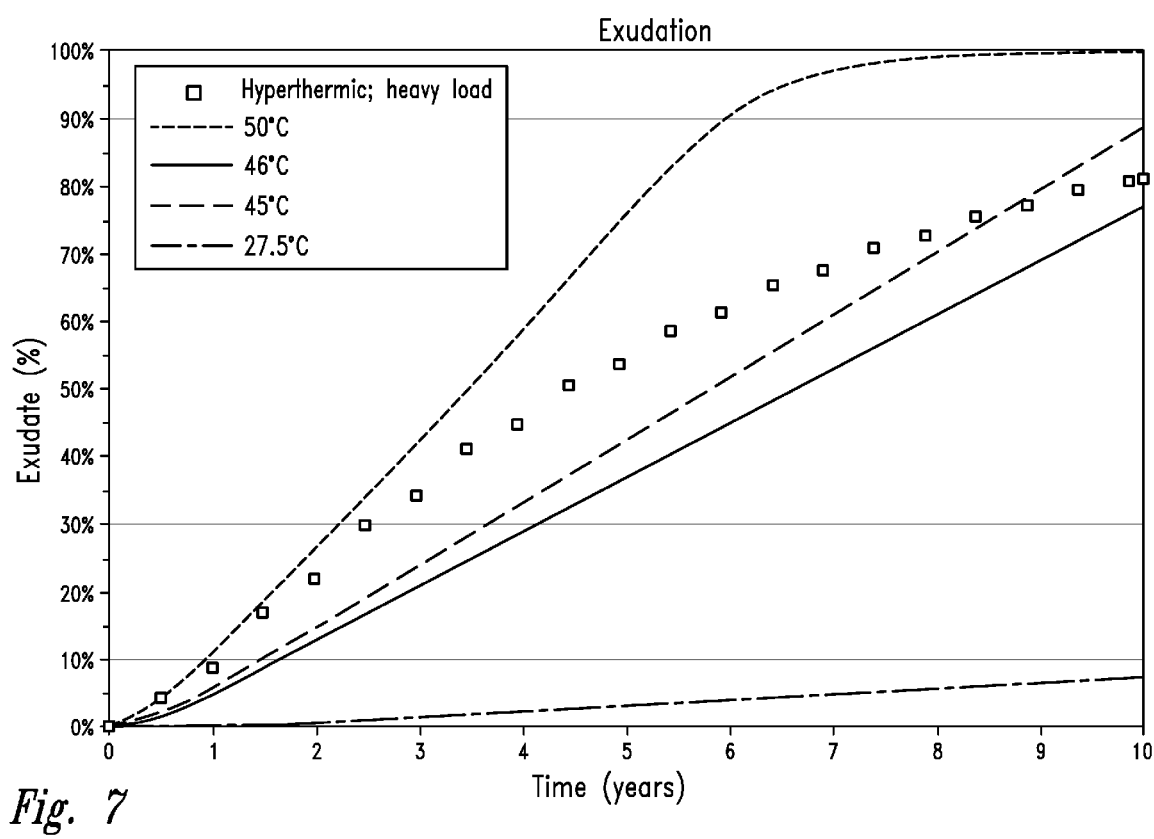
FIG. 7 is a plot of the cumulative exudation of the fluid mixture of FIG. 6 from the insulation.
Figure 8:
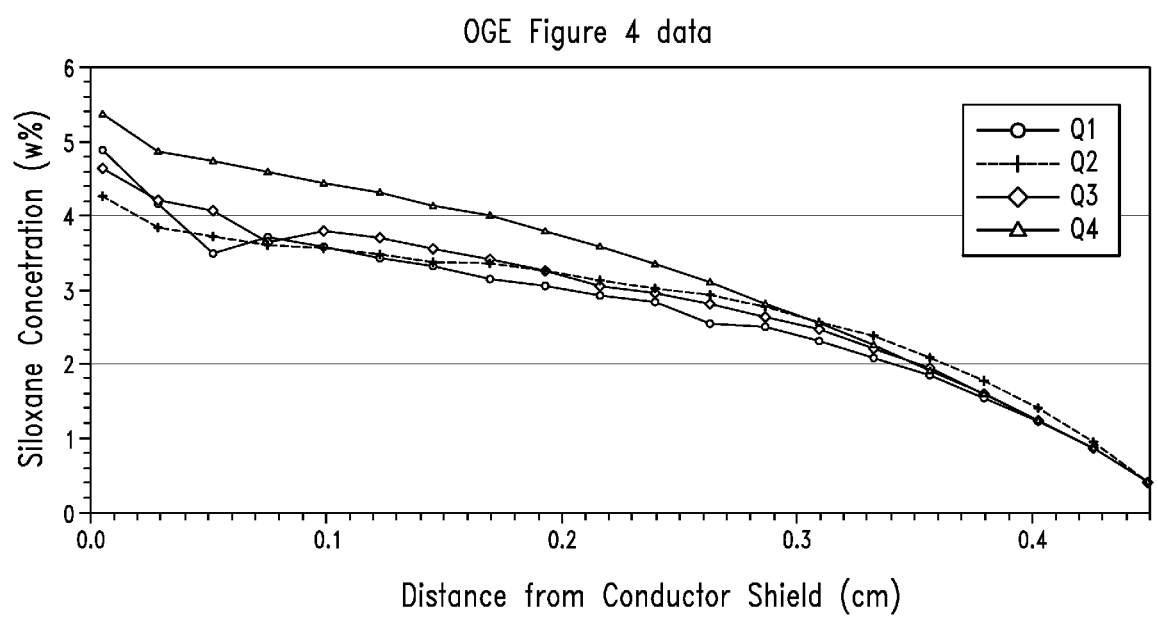
FIG. 8 is a plot of published data for OGE 15 kV 750 kcmil cable after 14 months of field aging ("Cable fault prevention using dielectric enhancement technology," Mokry et al, Jicable 1995).

From the computer simulation described above, the approximate radial concentration distribution of each component of the above fluid mixture, as well as the total thereof, is provided in FIG. 6 for a time t=5¼ years after the virtual injection. In this figure, the respective component weight percentage is plotted against radial position in the cable and each interface between the various layers of the cable is delineated with a vertical demarcation line. Thus, working from left to right, the first interface is between the stranded conductor and the conductor shield, then between the conductor shield and the insulation, then between the insulation and the insulation shield, and, finally, between the insulation shield and the hyperthermic soil in which the cable is buried. The curve for each component of FIG. 6, which is an output provided in Section 910 of the above simulation, can be numerically integrated with respect to radial position out to the outermost layer of the insulation and results then summed and finally subtracted from the initial total amount of fluid injected at t=0 to provide the total amount of fluid which has exuded from the cable at the above simulation time. Thus, for example, according to the computation of this simulation at 5¼ years after virtual injection (treatment), over half of the fluid supplied has exuded from the insulation. The cumulative exudation at various times is, in turn, plotted in FIG. 7 as the data points labeled "Hyperthermic; heavy load". Plotted alongside the data for the above example cable, which shows the respective points for simulations up to year 10 after virtual injection, are a series of assumed isothermal simulations between 27.5° C. and 50° C. (i.e., the temperature of the cable and the soil are assumed to be constant throughout each simulation), as indicated in the legend of FIG. 7. The assumed isothermal temperature of each subsequent simulation is chosen with the objective of matching the value of the virtual exudation curve at the end point of interest. For example, if the customer specified reliability requirement, as defined infra, is 10 years after actual treatment, the isothermal temperature which best matches the exudation curve at 10 years after virtual injection lies between 45 and 46° C. The isothermal temperature which most closely matches the exudation rate profile of the field cable at the customer specified design life is defined herein as the "flux-weighted temperature" according to the instant simulation method. For this example, with a customer specified reliability requirement corresponding to about an 80% exudation level (i.e., 80 wt % of the total fluid introduced is predicted to exuded from the insulation after 10 years), that temperature is approximately 45.3° C. and the 45.3° C. isothermal exudation line would cross the "Hyperthermic; heavy load" line at about post-treatment year 10.

In practice, of course, cable owners would not specify the above mentioned exudation value. Instead, they specify a dielectric reliability requirement. Thus, the cable owner can predict the approximate AC breakdown value of particular circuits utilizing at least one of several known methods:

Operational reliability history of the circuit, adjacent circuits, or similar circuits is predictive.

Samples of a population of cables can be excavated, analyzed, and assumptions about the performance of the population can be inferred.

Diagnostic tests, such as partial discharge or isothermal relaxation current, provide approximations of cable reliability performance.

Furthermore, it is well known in the art what AC breakdown performance is required to provide a desired level of reliability. One useful benchmark is that of Steennis (E. Frederick Steenis, "Water treeing: the behavior of water trees in extruded cable insulation", KEMA, $2^{nd}$ edition 1989). After extensive testing and comparison to operational reliability, it was found that, within the population of the cables tested which exhibited AC breakdown performance above 16 kV/mm (63% probability), none had ever failed in service. Thus, a customer might specify AC breakdown performance of 18 kV/mm for circuits with very high reliability requirements (e.g., hospitals, military facilities, electronic media broadcasters, emergency responder facilities, and manufacturing facilities) and perhaps a lower value such as 16 kV/mm for circuits that feed less critical applications, such as residential neighborhoods.

Figure 11:
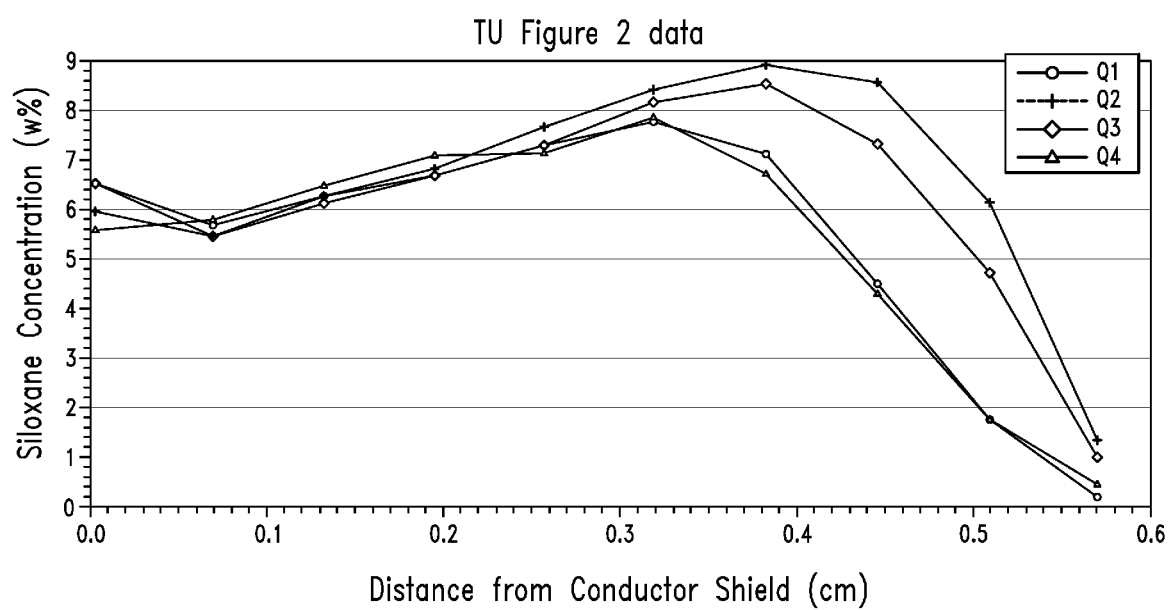
FIG. 11 is a plot of Texas Utilities Field Failure data from U.S. Pat. No. 6,162,491.
Figure 12:
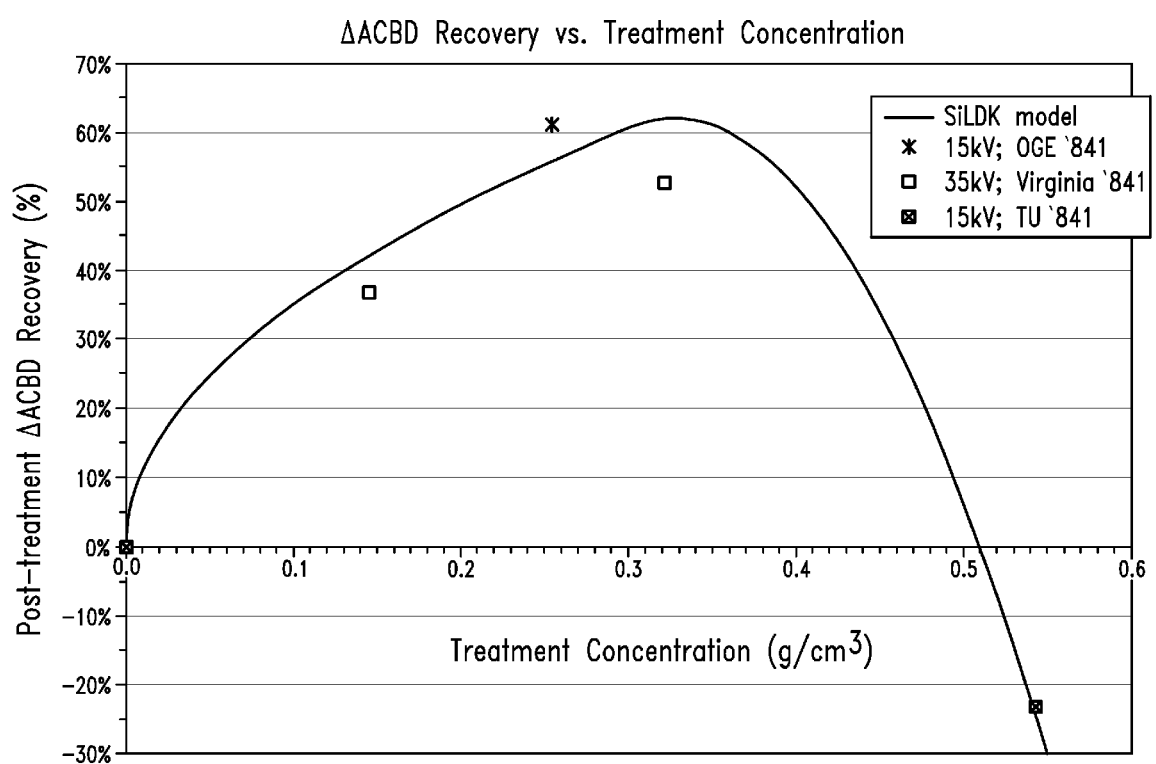
FIG. 12 is a plot of the compilation of all available results of the published data according to FIGS. 8-11 showing the relationship between average fluid concentration and post-treatment ACBD improvement.

Using data published in the literature it is possible to make predictions of post-treatment reliability based upon the concentration of treatment fluids in the insulation. FIGS. 8, 9, 10 and 11 are published results which disclose both the actual AC breakdown performance and the concentration profiles of the treatment fluid in the insulation. These figures represent different cables which were treated in the field with Cable-CURE®/XL fluid, the latter being a catalyzed mixture comprising phenylmethyldimethoxysilane and trimethylmethoxysilane in an approximately 70/30 weight ratio and marketed by Utilx Corp. As described previously, the concentration profiles in FIGS. 8 to 11 are numerically integrated to obtain the total fluid within the insulation. FIG. 12 is a compilation and transformation of these numerical integrations wherein the solid curve represents a regression fit of the points. Furthermore, for the data presented in FIG. 12, pre-treatment AC breakdown results, post-treatment AC breakdown results, and the concentrations of treatment fluids are published or easily estimated. By definition, the origin in FIG. 12 (i.e., 0,0 point) is known for each of these cases. That is, the increase in AC breakdown performance is zero at time zero. The post treatment ACBD data is transformed into the "percent recovered" metric of FIG. 12 as follows:

$$\%\Delta ACBD_{recovery} = (ACBD_{post\ treatment} - ACBD_{pre-treatment}) \div (ACBD_{new} - ACBD_{pre-treatment})$$

where $ACBD_{new}$ is arbitrarily defined as 40 kV/mm for polyethylene (PE) and 31.5 kV/mm for EPR-insulated cables, these values being typical for the respective polymers. Other values may be used for other insulation systems. In addition to the data of FIG. 12, a polynomial model is available to show the general relationship, at least for the preferred embodiment of the fluid mixture discussed in U.S. Pat. No. 5,372,841. It is believed that performance of other fluids would likely follow different lines than that shown in FIG. 12. The above polynomial model of FIG. 12 is represented by the equation:

$$\% \Delta ACBD = a\ \Sigma X_i^b - c(\Sigma x_i - d)^2$$

where a, b, c, and d are constants determined by statistical means, $\Sigma X_i$ is the sum of the individual concentrations of the alkoxysilane and siloxane oligomers of the CableCURE/XL fluid, and where the second term is 0 (below the threshold value of "d" for all negative ($\Sigma X_i - d$) (i.e., the data is fit empirically to this mode and the second term has a floor value of zero). The curve in FIG. 12 is defined by the foregoing equation and values for a, b, c, and d of 3.5, 0.5, 1800, and 0.3, respectively, obtained from a computer fit of the data. The first term ($a\Sigma x_i^b$) defines a generally parabolic relationship with diminishing returns of AC breakdown recovery for increasing concentration of treatment fluids. The competing second parabolic term ($-c(\Sigma x_i - d)^2$) represents mechanical strains from swell which subtract from cable reliability. This over saturation (or swelling), and the resulting strains, is induced in the cable by ever increasing concentrations of treatment fluid. "Over saturation" is defined herein as the introduction and dissolution of a relatively soluble component (e.g., one having a solubility in the insulation of greater than about 3 weight % at cable operating temperatures) which can lead to excessive swelling of the insulation and result in degradation of the mechanical properties thereof. Until some threshold concentration (d) is met, the second term is ignored, but once $\Sigma X_i$ exceeds (d), the function is evaluated and further increases in concentration decrease the reliability of the cable (i.e., a transition to over saturation occurs). A further effect of over saturation can be seen in FIG. 12, wherein a concentration of fluid greater than about 0.03 g/cm$^3$ is associated with reduced ACBD performance. Additionally, over saturation with any individual component can result in interference with the diffusion/equilibrium concentration of the other components in the insulation. This is in contrast with supersaturation, which is the condensation of previously dissolved fluid from the insulation due to thermal cycling, as described in U.S. Pat. No. 6,162,491, which teaches that the equilibrium concentration of the total amount of soluble components should be reduced by dilution to avoid supersaturation. FIG. 11 is a re-plotting of the data of FIG. 2 in U.S. Pat. No. 6,162,491. Swelling approaching 9% provides, and the attendant decrease in reliability demonstrates, that there is a point where too much fluid can be supplied to inflict damage from over saturation. However, it is now believed that a better approach to avoid supersaturation is the use of components having flat equilibrium concentration-temperature profiles, as described infra. The instant simulation method, together with post-injection performance models compiled using experimental data, can thus be used to estimate post-injection reliability.

With an approximation of the existing performance and the desired reliability specification, a correlation such as that depicted by FIG. 12 is applied to determine the minimum concentration of treatment fluid required to meet the reliability requirement. For example, referring to FIG. 12, assume a cable has an estimated 40 kV/mm original AC breakdown, with an estimated 10 kV/mm remaining AC breakdown (see above mentioned estimation methods), and it is desired to have an 18 kV/mm post-treatment AC breakdown. Then, from FIG. 12, the fluid concentration in the insulation must be maintained above 0.0056 g/cm$^3$ (i.e., the point where the simulation line, labeled "SiLDK model" in FIG. 12, crosses 27% "Post-treatment $\Delta$ACBD Recovery" on the way up, where the 27% $\Delta$ACBD is the change in ACBD=100 (18−10)/(40−10), but not greater than 0.0475 g/cm$^3$ (i.e., the point where the "SiLDK model" line crosses 27% on the "Post-treatment $\Delta$ACBD Recovery" on the way down) to avoid over saturation, as defined herein. Again, it should be recognized that the regression line of FIG. 12 must go through the origin (0, 0) since the concentration of treatment fluid is necessarily zero when fluid is first fed into the cable. The fluid concentration increases over time to some maximum and then begins a general decline, which may be punctuated with local maxima. Further restricting the shape of the time-dependent concentration curve of FIG. 12 is the requirement that the curve must start at zero and end at zero and can never be negative. How quickly the fluid concentration crosses the minimum performance expectation on the way up is also important and it is also predicted by the instant simulation method. When a high pressure method, such as that described in above cited Publication No. US 2005/0189130 or Publication No. US 2005/0192708 is used to inject and confine the dielectric enhancement fluid in a cable, this time can be a matter of several days. However, with the prior art (low pressure) approaches, months or even years can pass before the maximum performance is achieved and the instant simulation method allows prediction of dielectric performance for a wide variety of circumstances as a function of time. A plot similar to that of FIG. 12 can be obtained experimentally for any other restorative fluid composition, such as the above described mixture of menthylanthranilate and ferrocene or the compositions of Table 1, and the above description will serve to illustrate its application in the practice of the instant simulation method.

Again, for the above discussed menthylanthranilate/ferrocene mixture, integration of each component curve within the insulation area of FIG. 6 with respect to radius, in the manner discussed above, yields a total predicted treatment concentration of 0.0143 g/cm$^3$ after 5¼ years. If, for example, the menthylanthranilate/ferrocene system had a similar performance profile to the SiLDK model of FIG. 12, the treatment would provide more than the above required minimum treatment fluid concentration of 0.0056 g/cm$^3$. The simulation is continued until the total fluid concentration is predicted to reach a value equal to the customer specified minimum (e.g., 0.0056 g/cm$^3$ in the above example). It is at that point that the time and exudation indicated in FIG. 7 is established and at which an isothermal simulation curve crosses simulated data to establish the flux-weighted temperature (e.g., 80% exudate after 10 years in FIG. 7 in the above example).

Optimization of performance can be made at one flux-weighted temperature which matches several of the field profiles plotted in FIG. 1. Each of the formulations listed in Table 1 represents just such an optimization. Furthermore, once the flux-weighted temperature is determined according to the above described simulation, preferred components can be identified and included in the dielectric enhancement fluid composition used to treat the subject cable, employing either a conventional low-pressure method or a high-pressure one, as disclosed in Publication No. US 2005/0189130, cited supra. Again, each fluid described in Table 1 includes some of these preferred components.

Since increasing the amount of fluid injected increases the amount of time each component thereof is present above any threshold concentration and needed to provide the desired ACBD value, the amount of total fluid preferably injected is as large as possible. This preferably entails using the above mentioned high-pressure method, but can be used with the lower pressure methods as well, in either case with the following preferred constraints:

1. The pressure of injection and containment should be below the yield point of the cable,
2. Total fluid within the insulation at any time during the post-treatment period is maintained below the point where over saturation hampers reliability performance,
3. Treated life expectancy of the cable meets or exceeds customer requirements, and
4. The incremental cost of additional fluid (and/or its delivery) is greater than the value perceived by the customer.

Example of the Instant Simulation Method in a Marketing Mode

The following example illustrates that the prior art method using phenylmethyldimethoxysilane or CableCURE® with a low pressure injection using a soak period is predicted by the simulation to have inferior longevity versus one of the formulations of Table 1.

Consider the cable described by Kleyer and Chatterton in their paper, "The Importance of Diffusion and Water Scavenging in Dielectric Enhancement of Aged Medium Voltage Cables" (IEEE/PES conference; Apr. 10-15, 1994). The cable and the experiment were described as follows:

" . . . a 1/0 AWG, 15 kV rated cable . . . cut into segments, filled with phenylmethyldimethoxysilane and the ends sealed before immediate immersion in a 60° C. constant temperature water bath. At various time intervals (7, 17, 27, 54, 67 and 248 days) a segment was removed from the bath, sectioned and the insulation was profiled by microscopic infrared spectroscopy for treatment distribution."

Figure 4:
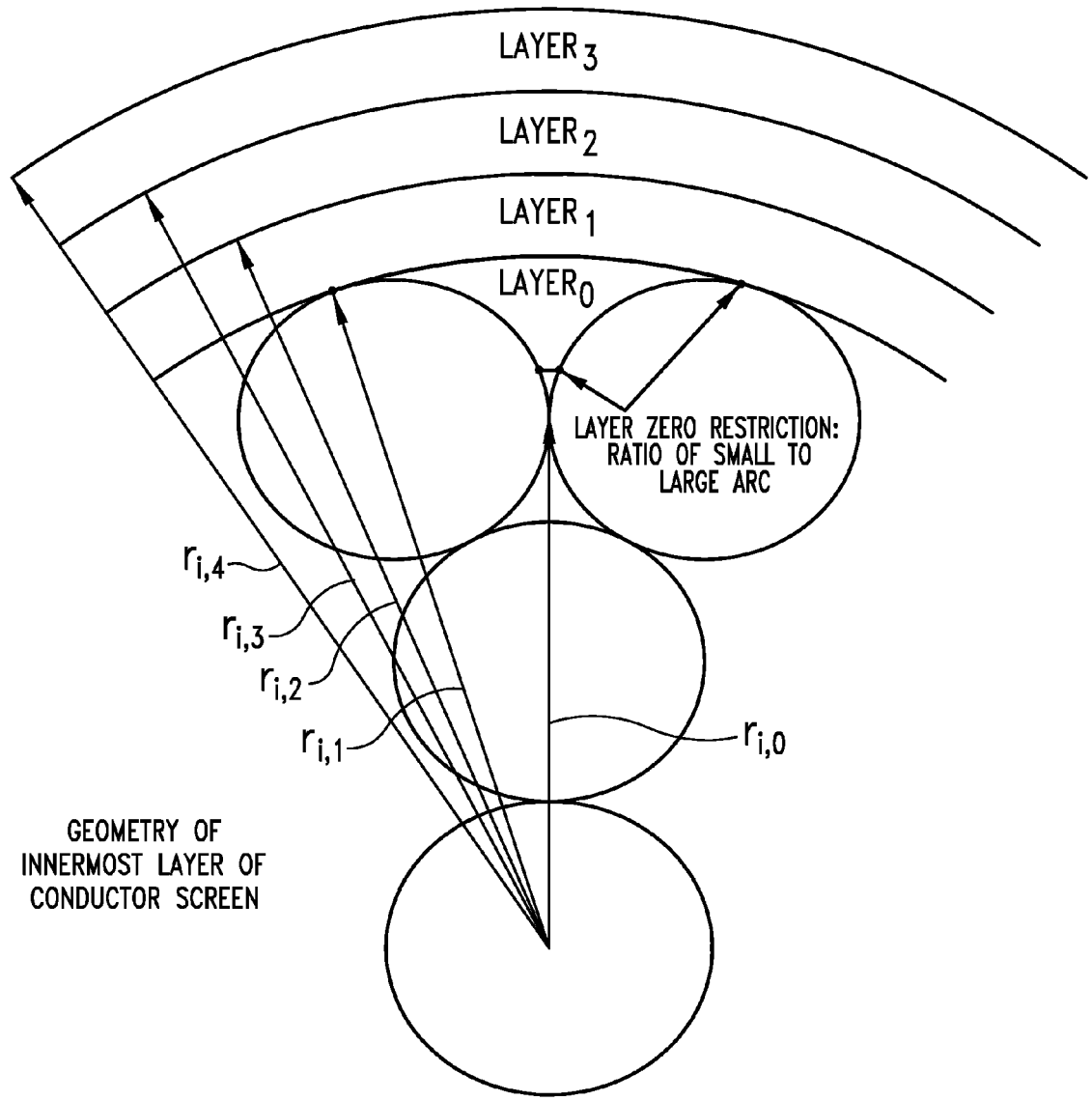
FIG. 4 is an illustration of the geometry of the innermost cable layer of a stranded conductor.
Figure 15:
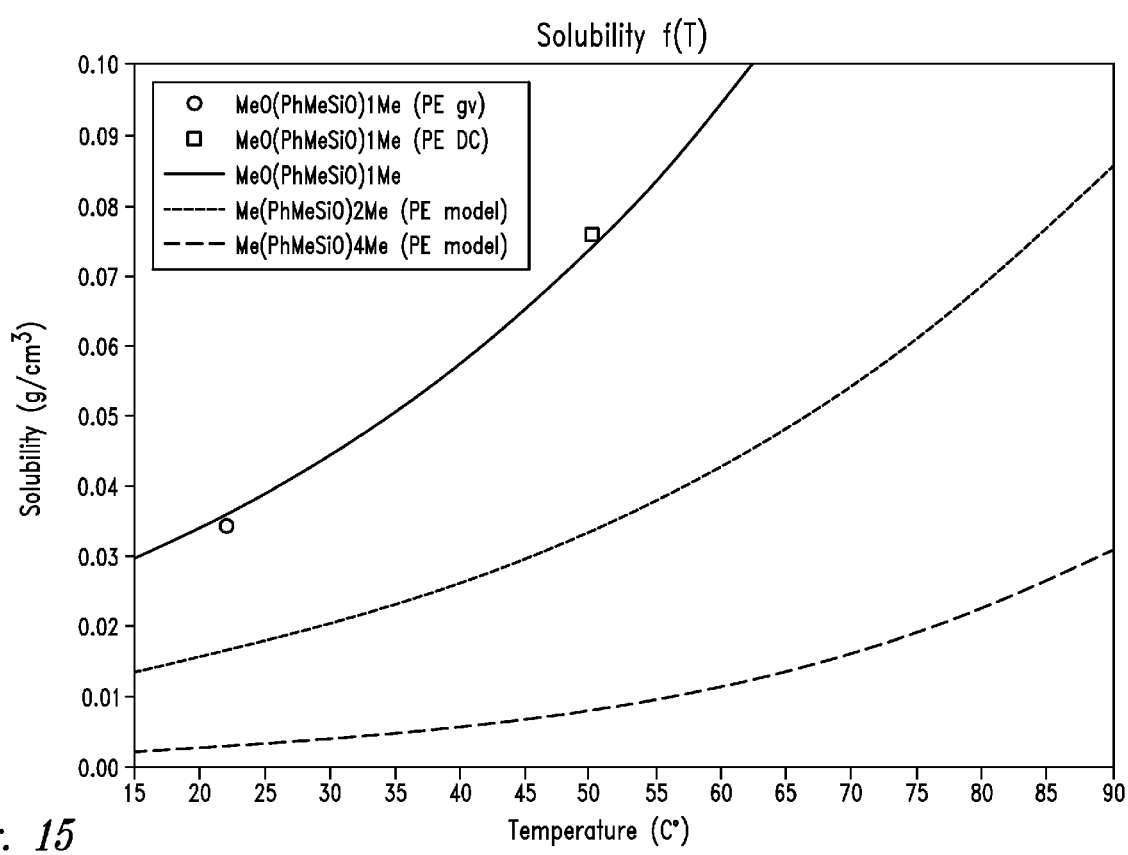
FIG. 15 is a plot of the equilibrium concentration (solubility) of various alkoxysilanes and oligomers in polyethylene as a function of temperature.

The results of that experiment, which are plotted in FIG. 4 of the Kleyer & Chatterton paper, were refined and re-plotted as FIG. 15 in "Dielectric Enhancement Technology" by Bertini & Chatterton in March/April 1994 IEEE Electrical Insulation Magazine. The latter data were digitized and are re-plotted herein in FIG. 13. It should, however, be noted that the original paper by Kleyer and Chatterton did not provide a complete description as the insulation thickness was omitted and the above mentioned refinement required some assumptions/approximations. Nevertheless, this should serve to illustrate the principles of the instant simulation method and a similar plot for any given fluid could be generated and used to fit the parameters, as described below.

The total amount of fluid in the insulation of the cable for each curve in FIG. 13 ($M_{insulation}$) can be obtained by numerically integrating the concentration profile across the cylindrical geometry of the cable:

$M_{insulation} = \Sigma X_{siloxane,l} \cdot v_l$ (for all layers, $l$, provided in FIG. 13)

where $X_{siloxane,l}$ is the mass concentration of the silane monomer and its siloxane oligomer components (in this case, phenylmethyldimethoxysilane and oligomers thereof and having the units g/cm$^3$) in each layer, l. In the above equation, $v_l$ is the volume of each cylinder, defined by an arbitrary length and inner and outer radii. The mass concentration is the measured value halfway between the inner and outer radii. The results of this calculation are shown as triangles in FIG. 14 and reveal the total concentration of silane and siloxane in the insulation for the following times: 7, 17, 27, 54, 67 and 248 days. Plotted along with the above data in FIG. 14, are simulations (i.e., the curves) according to the instant simulation method, wherein the above mentioned parameters were adjusted until an acceptable regression fit was achieved (Sim 36 in FIG. 14). Notwithstanding the necessary approximation of the above data refinement, and deciphering the cable geometry as best as possible, it is possible to virtually recreate the 12 year-old experiment using the instant simulation method and derive information about reaction rates and permeation properties of the phenylmethyldimethoxysilane fluid. Thus, the parameters that are adjusted to fit the data of FIG. 14 are:

1) Reaction rate,
2) ($\alpha$) for the phenylmethyldimethoxysilane and its oligomers and (a) for water,
3) amount of initial fluid as a percentage of the interstitial volume,
4) layer zero restriction ratio, and
5) extent and location of the halo as a histogram, wherein the halo is the percent of the insulation volume that is void (i.e. no insulation). The histogram may often be conveniently represented as a normal distribution by identifying the radial location of the peak, the value of the peak and the standard deviation of the distribution along the radius.

A computer program could employ well-known techniques, such as an adaptive randomly directed search, to adjust all of the above parameters simultaneously to get the best fit to a plot like FIG. 14. Alternatively, these parameters could be adjusted one at a time, or a few at a time. Utilizing standard regression procedures one can determine the best fit solution for the parameters. As an example, the actual parameter values obtained in Simulation 36 (Sim 36) in FIG. 14 are:

(1) Reaction Rates

The following table summarizes the various parameters for rate constants, k, for phenylmethyldimethoxysilane and its products of hydrolysis/condensation.

| | without catalyst | | with titanium(IV) isopropoxide catalyst | |
|---|---|---|---|---|
| Reaction | Frequency Factor $k_0$ (mol/cm$^3$)$^{1-n}$/sec | Activation energy E cal | Frequency Factor $k_0$ (mol/cm$^3$)$^{1-n}$/sec | Activation energy E cal |
| PhMe-1.0 + H$_2$O → PhMe-1.1 + MeOH | 5.67E+14 | 23,000 | 5.67E+14 | 10,000 |
| PhMe-1.1 + H$_2$O → PhMe-1.2 + MeOH | 2.83E+14 | 23,000 | 2.83E+14 | 10,000 |
| 2 PhMe-1.1 → PhMe-2.0 + H2O | 1.42E+14 | 23,000 | 1.42E+14 | 10,000 |
| 2 PhMe-1.1 → PhMe-2.1 + MeOH | 1.42E+13 | 23,000 | 1.42E+13 | 10,000 |
| 2 PhMe-1.2 → PhMe-2.2 + H$_2$O | 2.83E+14 | 23,000 | 2.83E+14 | 10,000 |
| PhMe-1.1 + PhMe-1.0 → PhMe-2.0 + MeOH | 7.08E+12 | 23,000 | 7.08E+12 | 10,000 |
| PhMe-1.1 + PhMe-1.2 → PhMe-2.1 + H$_2$O | 1.89E+14 | 23,000 | 1.89E+14 | 10,000 |
| PhMe-2.0 + H$_2$O → PhMe-2.1 + MeOH | 1.42E+14 | 23,000 | 1.42E+14 | 10,000 |
| PhMe-2.1 + H$_2$O → PhMe-2.2 + MeOH | 7.08E+13 | 23,000 | 7.08E+13 | 10,000 |
| PhMe-1.2 + PhMe-2.2 → PhMe-3.2 + H$_2$O | 5.67E+13 | 23,000 | 5.67E+13 | 10,000 |
| PhMe-1.2 + PhMe-3.2 → PhMe-4.2 + H$_2$O | 1.13E+13 | 23,000 | 1.13E+13 | 10,000 |
| 2 PhMe-2.2 → PhMe-4.2 + H$_2$O | 2.27E+12 | 23,000 | 2.27E+12 | 10,000 | wherein Ph represents a phenyl group, Me represents a methyl group and PhMe-X.Y indicates a silane having a DP of X and where Y indicates the number of hydroxyl groups formed by the corresponding hydrolysis. Thus, for example, PhMe-1.0 is monomeric phenylmethyldimethoxysilane, PhMe-1.2 is (Ph)(Me)Si(OH)$_2$, PhMe-2.0 is the dimer (Ph)(Me)(MeO)SiOSi(OMe)(Me)(Ph), and so on.

(2) ($\alpha$) for phenylmethyldimethoxysilane and its oligomers (PM) and ($\alpha$) for water (H2O):

$\alpha_{H2O} = 0.30$ $\alpha_{PM} = 0.75$ (3) Amount of initial fluid as a percentage of the interstitial volume is 108%
(4) Layer zero restriction ratio is 3.5%, and
(5) Extent of the halo
  Peak of halo is 2% void in insulation;
  Standard deviation of the halo void distribution is 71 mils;
  Peak is located at a radius of 830 mils In order to further clarify the curve-fitting of the parameters to the actual data, the following discussion is believed helpful. Again, with reference to FIG. 14, after the total concentration of phenylmethyldimethoxysilane and its oligomers peaks at about 10 days, the rate of decay of the concentration of the phenylmethyldimethoxysilane and its oligomers is most dependent on the reaction rates of conversion of monomer to the various oligomers. These reaction rates, in turn, are most dependent on the reaction kinetics and the concentration of water and catalyst available across the radius of the cable. If the modeled reactions proceed more rapidly than exhibited by the actual data, then the reaction rate constant, or the concentration of the water available for reaction, in the simulation is reduced.

The water concentration is dependent upon the amount of water present in the insulation, including the halo which is always present in aged cable, and the amount of water in the conductor shield before treatment. Even more importantly, this concentration depends upon $\alpha_{water}$) as defined in the description of Section 400, above, which largely determines the rate at which water ingresses from the outside into the cable throughout the simulation. If there were no deviation from ideal solution behavior, then water would be virtually excluded from cable since it has a much lower equilibrium concentration than the alkoxysilane (i.e., if $\alpha_{water}=1$, then there would be very little penetration by water; if $\alpha_{water}=0$, then the presence of other components would not affect water permeation). Two other independent data points provide constraints on the water availability and the reaction rates. The first constraining data point is the indication that an anhydrous, or largely water-free, environment persists for some time in the interstices of cables treated with the prior art materials (i.e., phenylmethyldimethoxysilane in this case). See, for example, "Failures in Silicone-treated German Cables Due to an unusual Aluminum-Methanol Reaction", Bertini, Presented to the Transnational Luncheon of the ICC, Oct. 29, 2002. If $\alpha_{water}$ is too low, or the reaction rate is too slow, water will permeate into the strands and an anhydrous environment will never be achieved. The second constraint was supplied by the previously cited Kleyer and Chatterton paper, when they wrote:

"The presence of the water reactive functionality of phenylmethyldimethoxysilane within the insulation was confirmed by microscopic infrared spectroscopy (Si-OMe band at 1190 cm$^{-1}$) through 54 days."

In other words, methoxy groups were still observable by micro-IR at 54 days, but were no longer observed at 67 days. The reaction rate of the simulation is constrained by the practical observation that all IR-measurable quantities of methoxy functionality must disappear in the 13 days between 54 and 67 days.

These two constraints, along with FIG. 14 data, are used to establish $\alpha_{water}$ and the chemical kinetics, which, in turn, largely determine the slope of the curve in FIG. 14 between the peak (at about 10 days) and the point at 54 days. The reaction rates and the $\alpha_{water}$ were established by a regression fit of the refined Kleyer data. The point at which the curve in FIG. 14 flattens somewhat is determined primarily by the amount of the originally supplied fluid which exudes un-reacted or under-reacted (i.e., no condensation to form oligomers). In this illustration, exuded, un-reacted or under-reacted fluid encompasses monomeric species and hydrolysis derivatives of phenylmethyldimethoxysilane, specifically including those monomers with only methoxy ligands, only hydroxyl ligands, and those with one each methoxy and hydroxyl, which exude from the insulation. Vincent demonstrated (see Table 2 of U.S. Pat. No. 4,766,011) that, without catalyst, there was no observable condensation of monomer in the presence of water for the phenylmethyldimethoxysilane monomer employed by Kleyer and Chatterton. Hence, the reaction rate without catalyst is inconsequentially small.

The 194-day plateau and slow decay region, from day 54 to day 248, is determined by the rate of exudation of the condensing oligomer. During this period, there is a steady flux of several oligomeric species out of the insulation, and for a while, a corresponding approximately equal flux into the insulation of the fluid remaining in the conductor interstices and the conductor shield. Once the latter supply is nearly depleted, the flux into the insulation begins to decrease and the total concentration therein begins to decrease along with it. Those skilled in the art will recognize that, as the total concentration begins to decrease, the exudation out of the insulation also slows. This final period is well described as an exponential decay to zero.

Fitting of the last 248 day point depends almost entirely on the permeation rate of the dynamic mix of oligomers. As described previously, Chatterton and Bertini provide permeation equations for monomer, dimer and tetramer. The dimer and tetramer were terminated with methyl groups to determine experimental diffusion rates. This does not exactly correspond to the real-world case where these oligomers are generally terminated with hydroxyl groups or potentially cyclized. Even with these differences, reasonable interpolations and extrapolations to other members of the homologous series of oligomers (e.g. linear trimer and pentamer) can be readily made by those skilled in the art. The distribution of homologous oligomers can thus be determined by the transition time from the plateau period to the exponential decay period of FIG. 14. For example, if a simulation predicted that the concentration decreased such that the resulting curve fell to the left of, and below, the measured value (e.g. Sim 32 in FIG. 14), then the dynamic average degree of polymerization (DP) would have to be increased. On the other hand, if the simulated line fell above, and to the right of, the measured value (e.g. Sim 35), the dynamic DP would have to be decreased. These dynamic DP values would in turn be increased or decreased by increasing or decreasing the respective reaction rates of condensation to higher oligomers. The aforementioned Kleyer and Chatterton paper provides guidance on the subject when they report:

"The data confirmed that oligomerization occurs within the strands, providing a polymeric distribution through a degree of polymerization (DP) of eight or more."

Those familiar with methoxysilane hydroysis will appreciate that a statistical distribution of DPs is formed, driven by chemical reaction considerations. Yet another constraining consideration is the average concentration in the insulation during the period from 54 to 248 days. As the DP increases, the equilibrium concentration due to lowered solubility decreases and hence a simulation falling below the 54 day and 67 day data points implies that the average DP is too great while a simulation curving above those two points would imply an average DP that is too low.

All other variables not adjusted as empirical constants in the previous paragraphs which are required to complete the simulation were measured by experimental means and/or were obtained from published results.

Components of the Fluid Compositions of the Instant Method for Extending Long-Term Electrical Power Cable Performance According to the instant method, four classes of materials designed to provide life extension beyond the practical effective life of prior art cable restoration methods now disclosed.

The restoration method for treating cables at elevated pressures disclosed in United States Patent Application Publication No. US 2005/0189130, and the method for selecting formulations for injection at elevated pressures disclosed in Publication No. US 2005/0192708 teach the addition of more fluid than can be accommodated in the interstitial void volume of the cable and the proper amount of the fluid which increases the total post-treatment life expectancy of a cable relative to conventional low pressure restoration methods. However, the dielectric enhancement fluids disclosed herein comprise at least one component to extend the post-treatment life even further. This is accomplished by maintaining the component within the insulation for periods greater than now possible with conventional alkoxysilane restorative fluids. Furthermore, the components disclosed herein help to keep water in the insulation at very low levels and, in the case of one class of such materials, to prevent supersaturation of the insulation.

The above cited article by Kleyer and Chatterton reports the permeation characteristics of phenylmethyldimethoxysilane monomer, dimer and tetramer as a function of temperature. FIG. 15 provides the equilibrium concentration (i.e., solubility) of these three materials in polyethylene insulation as a function of temperature, along with two measured points for the monomer. In FIG. 15 "PE model" is the least squares Arrhenius equation provided by Kleyer & Chatterton. The equilibrium concentration decreases by more than two-fold with each doubling of the molecular size. At 30° C., for example, the equilibrium concentration decreases from 0.045 g/cm$^3$ to 0.020 g/cm$^3$ to 0.004 g/cm$^3$ for monomer, dimer and tetramer, respectively.

As discussed above, FIG. 12 provides the overall relationship between actual average fluid concentration of alkoxysilanes in the insulation and the incremental increase in AC breakdown (ACBD) performance expressed as a recovery. As evidenced by FIGS. 8, 9 and 10, the concentration of the siloxane species decreases from the inside of the cable, where the fluid is supplied, to the outside of the cable, where the fluid exudes into the surrounding environment with a concentration of zero. This decreasing profile means that the actual average concentration of any component is some value less than its maximum possible value as determined by respective equilibrium concentration. Thus, for example, if we multiply the above mentioned equilibrium concentrations for phenylmethyldimethoxysilane and its oligomers at 30° C. from FIG. 15 by 0.75 to estimate the decreasing concentration (i.e., from saturation near the internal surface of the insulation to close to zero at the external surface of the insulation as shown) the mean concentrations for monomer, dimer, and tetramer, respectively, would be about 0.034 g/cm$^3$, 0.015 g/cm$^3$, and 0.003 g/cm$^3$ at an average operating temperature of 30° C. FIG. 12 provides guidance on anticipated performance and, based on the above reduced concentrations, monomer should be able to recover about 62% of lost dielectric strength, dimer about 43% and tetramer about 20%. Typical ACBD for aged, untreated cable is about 11 kV/mm, while its initial performance is approximately 40 kV/mm. On an absolute basis, one would expect an ACBD of 29.0 kV/mm (i.e., 11+0.62(40−11)), 23.5 kV/mm, and 16.8 kV/mm when the cable is dynamically saturated with monomer, dimer and tetramer, respectively. However, dynamic saturation is an unsustainable condition when a cable has a finite fluid reservoir which is asymptotically depleted as the fluid diffuses out of the cable. Furthermore, while 29 kV/mm and 23.5 kV/mm ACBD values would assure reliable operation as long as the cable is saturated with monomer or dimer, respectively, the dwell time of these relatively quick permeating materials in the insulation is too short to extend the service life of the cable beyond a couple of years for cooler (i.e., low load) cables or only a couple of months for cables operating at high temperatures.

Thus, the conundrum faced by the prior art technologies employing alkoxysilane restorative fluids is that the very process that allows the material to dwell for longer periods of time, namely the oligomerization of monomeric species, decreases the overall treatment efficacy due to the lower equilibrium concentration of the oligomers in the insulation relative to the monomer. The 16.8 kV/mm ACBD for the above tetramer-treated cable is just above the 16 kV/mm value generally considered needed to insure reliable performance, as noted supra.

Figure 16:
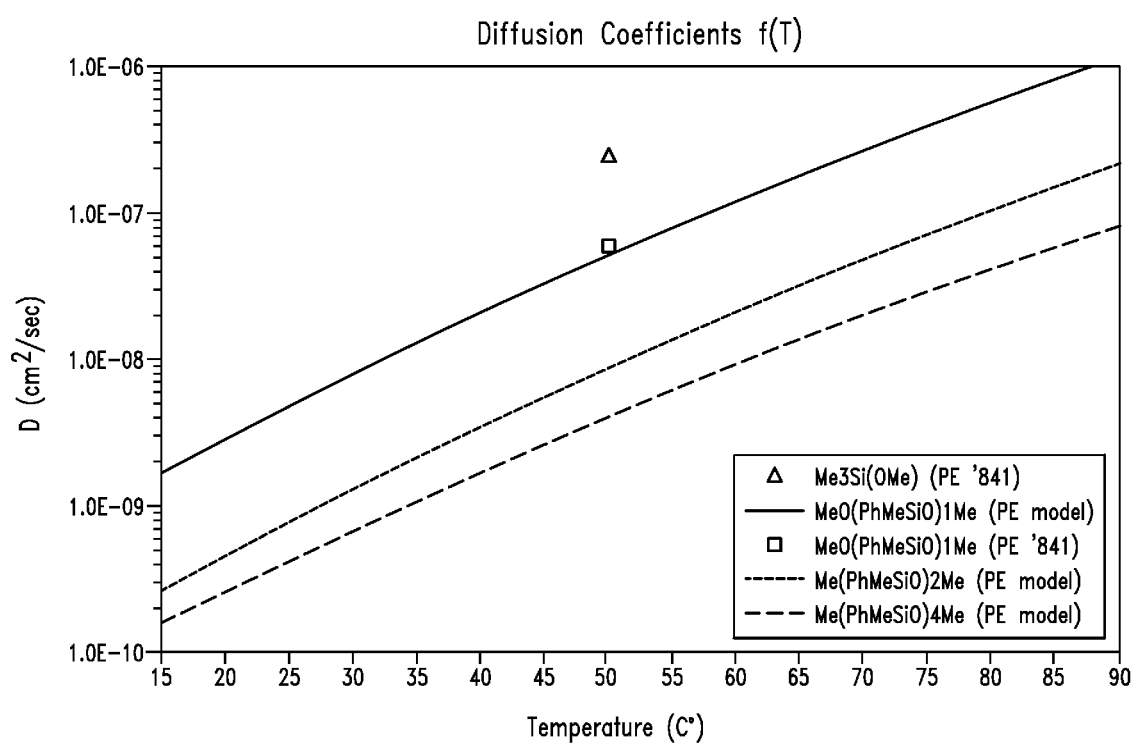
FIG. 16 is a plot of the diffusivities of various alkoxysilane and oligomers in polyethylene as a function of temperature.

Again, in the above cited article by Kleyer and Chatterton, the permeation characteristics of phenylmethyldimethoxysilane monomer, dimer and tetramer were presented. Additionally, the diffusion coefficient at 50° C. of trimethylmethoxysilane, a preferred quickly-diffusing component of the most widely used current cable restoration technology, is disclosed in U.S. Pat. No. 5,372,841. FIG. 16, provides the diffusivities of these materials in polyethylene as a function of temperature. As the mass of the molecule approximately doubles from monomer to dimer, the diffusion coefficient at 50° C. decreases by a factor of 5.9 (from 52.2×10$^{-9}$ cm$^2$/sec to 8.89× 10$^{-9}$ cm$^2$/sec) and then, as the mass essentially doubles again from dimer to tetramer, the diffusion coefficient decreases by a factor of 2.1 (from 8.89×10$^{-9}$ cm$^2$/sec to 4.14×10$^{-9}$ cm$^2$/sec). The declining returns of oligomerization with this prior art technology limit the total cable life of this approach since, on average, oligomerization beyond the tetramer is at very low levels due to cyclization of the relatively dilute organosilane in the polymeric matrix in which the condensation reaction occurs. And even if oligomerization were to proceed to form, e.g., a hexamer, there is very little incremental reduction in the diffusion coefficient with each additional siloxane unit. Any incremental decrease in diffusivity with increased degree of polymerization is more than offset, as described in the equilibrium concentration discussion above, since there is an associated performance penalty for longer oligomers due to reduced equilibrium concentration. This limitation was never recognized in prior art cable restoration methods.

Each of the first three classes of dielectric enhancement fluid components disclosed herein overcomes the above discussed limitations and offers the combination of slow diffusion while maintaining sufficient equilibrium concentration in the insulation polymer at the average cable operating temperature T, preferably at the above defined flux-weighted temperature. $T_{flux-avg}$. For the purposes herein, the average cable operating temperature is defined as the time-weighted temperature average at the mid-radius of the insulation jacket. Typically, this average operating temperature is about 10° C. above the average soil temperature (see computer simulation description above) at cable depth for underground distribution (URD) cables. The corresponding values for feeder cables are about 10 to 40° C. above the average soil temperature. As a result, an in-service cable treated with one or more of the disclosed components, either in a conventional low-pressure restoration method or in a high-pressure method, exhibits a significantly greater longevity than can be achieved with dielectric enhancement fluids in current use. The instant components are selected from liquid or solid materials belonging to at least one of the following four classes.

The first component class (Class 1) according to the present method is selected from: a water-reactive organosilane monomer having at least two water-reactive groups (i.e., the organosilane can undergo hydrolysis and subsequent condensation), such an organosilane monomer wherein at least one of the water-reactive groups has been substituted with a condensable silanol group (i.e., it has been partially or completely hydrolyzed), an oligomer of the above described monomers, or a co-oligomer of the above monomers with a non-Class 1 organosilane, each oligomer or co-oligomer having either residual water-reactive and/or silanol functionality. Thus, for example, the organosilane can be an alkoxy-functional organosilane, a reaction product thereof which contains residual alkoxy, or an enoloxy-functional organosilane, such as those illustrated in Table 2, below. Additional water-reactive systems contemplated include ketoxymo, amino, amido, acyloxy and hydrido groups bonded to silicon. For the purposes herein, the monomer (or the monomer parent of any above-mentioned oligomer or co-oligomer) of the Class 1 component exhibits a diffusion coefficient in the insulation polymer which is at least about 15 times greater than that of the corresponding tetramer, the latter being terminated with either the residual water-reactive group(s) or silanol group(s). This ratio of diffusion coefficients of monomer to tetramer is measured at the average operating temperature of the cable, or preferably at the above defined flux-weighted temperature, and is preferably greater than about 20. By comparison, for example, this ratio for phenylmethyldimethoxysilane monomer/tetramer is about 12.6 at 50° C. (from FIG. 16).

TABLE 2

| Material Number | Class 1 Component |
|---|---|
| 1 | phenylmethyldimethoxysilane |
| 2 | (3-methylphenyl)methyldimethoxysilane |
| 3 | 3-cyanopropylmethyl dimethoxysilane |
| 4 | di(p-tolyl)dimethoxysilane |
| 5 | (4-methylphenyl)methyldimethoxysilane |
| 6 | 2-cyanobutylmethyldimethoxysilane |
| 7 | phenethyltrimethoxysilane |
| 8 | (p-tolylethyl)methyldimethoxysilane |
| 9 | (p-styrlethyl)trimethoxysilane |
| 10 | Reaction product(s) of 4-Amino-2,2,6,6-tetramethylpiperidine and dimethoxymethyl(3-chloropropyl)silane |
| 11 | 3-(2,4-dinitrophenylamino)propyltriethoxysilane |
| 12 | 3-(triethoxysilylpropyl)p-nitrobenzamide |
| 13 | 2-hydroxy-4-(3-triethoxysilylpropoxy)-diphenylketone |
| 14 | Reaction product(s) of methyldimethoxysilane and 2-[3-(2H-benzotriazol-2-yl)-4-hydroxyphenyl]ethyl methacrylate |
| 15 | methylphenyl bis (1-phenylethenyloxy)silane |
| 16 | methylvinyl bis (1-phenylethenyloxy)silane |

When a Class 1 component is included in a dielectric enhancement fluid which also contains another condensable silane (i.e., not a Class 1 component but one which can condense with a Class 1 component), a co-oligomer can form between these species upon hydrolysis/condensation in addition to the respective homo-oligomers. Thus, since some units contain the larger and/or less flexible Class 1 group, the mass flux of the total oligomer is retarded. Put another way, judicious formulation with Class 1 components allows the tailoring of the total oligomer exudation flux to a value lower than for the alkoxysilanes used in the prior art cable restoration methods. Preferred Class 1 components include p-tolylethylmethyldimethoxysilane, cyanopropylmethyldimethoxysilanes (e.g., 3-cyanopropylmethyldimethoxysilane), and cyanobutylmethyldimethoxysilanes (e.g., 2-cyanobutylmethyldimethoxysilane).

It is also preferred that the organoalkoxysilane components of any class described herein are used in conjunction with a condensation catalyst. The catalysts contemplated herein are any of those known to promote the hydrolysis and condensation of organoalkoxysilanes, provided they do not adversely affect the cable components (e.g., they do not corrode copper or aluminum conductors). Typically, these are selected from organometallic compounds of tin, manganese, iron, cobalt, nickel, lead, titanium or zirconium. Examples of such catalysts include alkyl titanates, acyl titanates and the corresponding zirconates. Specific non-limiting examples of suitable catalysts include tetra-t-butyl titanate (TBT), dibutyltindiacetate (DBTDA), dibutyltindilaurate (DBTDL), dibutyltindioleate, tetraethylorthotitanate, tetraisopropyl titanate (TIPT), tetraoctadecylorthotitanate, dibutyltindioctoate, stannous octoate, dimethyltinneodeconoate, di-N-octyltin-S,S-isooctylmercaptoacetate, dibutyltin-S,S-dimethylmercaptoacetate, or diethyltin-S,S-dibutylmercaptoacetate. In general, the catalyst is added at a level of about 0.05 to about 5% based on the total weight of the organoalkoxysilane components. More typically, it is supplied at a level of about 0.1 to about 2% or at a level of about 0.2 to 1% by weight according to the above mentioned basis.

The second component class (Class 2) comprises water reactive organosilane monomers, condensable monomers, oligomers or co-oligomers similar to those described above which contain at least one group or side-chain (—R) attached to silicon having between 7 and about 20 saturated carbon atoms. This R group can have a linear, branched or cyclic structure and can further comprise heteroatoms such as oxygen, nitrogen, and sulfur provided it also comprises at least 7 (—CH$_2$—) units, the latter not necessarily, but preferably, being sequential. Furthermore, R can be a substituted group if it meets the above criterion. Thus, for example, this group can have a skeleton such as CH$_3$—CH$_2$—CH$_2$—CH$_2$—CH$_2$—CH$_2$—CH$_2$—, CH$_3$—CH$_2$—CH$_2$—O—CH$_2$—CH$_2$—CH$_2$—CH$_2$—CH$_2$—, Ph-CH$_2$—CH$_2$—CH$_2$—CH$_2$—N—CH$_2$—CH$_2$—, Hex-CH$_2$—CH$_2$—CH$_2$—CH$_2$—CH$_2$—O—CH$_2$—CH$_2$—, Hex-CH$_2$—CH$_2$—, CH$_2$=CH—CH$_2$—CH$_2$—CH$_2$—CH$_2$—CH$_2$—CH$_2$—CH$_2$—, and so on, wherein Ph and Hex represent phenyl group and cyclohexyl group, respectively.

Preferably, Class 2 comprises C7 to C20 alkyl-functional alkoxysilanes such as:
Phenyloctyldialkoxysilane
Dodecylmethyldialkoxysilane
n-octadecyldimethylmethoxysilane
n-decyltriethoxysilane
dodecylmethyldiethoxysilane
dodecyltriethoxysilane
hexadecyltrimethoxysilane
1-docosenyltriethoxysilane
n-octyltrimethoxysilane
n-octadecyltrimethoxysilane
and partial hydrolyzates of the above alkoxysilanes The larger hydrocarbon groups will generally increase the equilibrium concentration of the Class 2 component as well as decrease its diffusivity in the insulation polymer. Furthermore, while some unsaturation on the side chains is permitted, these R groups are preferably saturated straight chain hydrocarbons, such as octyl, nonyl, decyl, undecyl, dodecyl, tetradecyl and hexadecyl. Less preferred are arylalkyl or substituted alkyl side chains provided the above criterion is met. It is believed that increasing the number of methylene units of the hydrocarbon group of the Class 2 component also retards diffusion due to steric hindrance. Although a perceived disadvantage of employing too many methylene units is that their bulk fills the limited treatment volume available, it is believed that the above recited chain lengths will provide the benefits of increased longevity without unduly sacrificing excess interstitial volume and without requiring too long a time for the material to diffuse into the cable insulation. These diffusion requirements vary, as described previously, depending on the expected operating temperature profile of the cable. As indicated in connection with the description of the Class 1 component, a co-oligomer would form when a Class 2 component is combined with another alkoxysilane to form the dielectric enhancement fluid, which co-oligomer would contain the relatively soluble hydrocarbon segment. While prior art alkoxysilane dielectric enhancement fluids such as phenylmethyldimethoxysilane trade off a large decrease in solubility to attain the desired decrease in diffusivity with increasing degree of polymerization, Class 2 materials enjoy a less severe decrease in equilibrium concentration as the degree of polymerization of the Class 2 component increases. Likewise, Class 2 components enjoy a lower reduction in equilibrium concentration (i.e., solubility in the insulation polymer) when employed in mixtures with other condensable materials as they co-oligomerize versus prior art alkoxysilane dielectric enhancement fluids, thereby mitigating the chemical condensation contribution to the supersaturation phenomenon described in U.S. Pat. No. 6,162,491. To illustrate this point, consider a polyethylene insulation jacket which is saturated with a catalyst-containing organoalkoxysilane monomer such as phenylmethyldimethoxysilane and is exposed to moisture. As the monomer hydrolyzes and condenses to form, e.g., a dimer, it immediately tends to supersaturate the polyethylene since this dimer has a lower solubility than one of the instant Class 2 materials. It should be appreciated that neither a Class 1 component nor a Class 2 component has to diffuse through the insulation polymer as rapidly as the oligomer of any other alkoxysilane present in the dielectric enhancement fluid with which it is to co-oligomerize. For example, if the other alkoxysilane were phenylmethyldimethoxysilane, this fluid could permeate into the insulation wherein a portion would dimerize (assuming water and an appropriate catalyst is also present). As long as some of the Class 1 or Class 2 component (i.e., the monomer thereof) can "catch up" with the dimer and higher oligomers of the phenylmethyldimethoxysilane, it will have an opportunity to co-oligomerize therewith, thereby creating a hetero-trimer or higher hetero-oligomer. Thus, while many of the Class 1 or 2 materials have lower diffusion rates than, e.g., phenylmethyldimethoxysilane, they would generally have higher diffusion rates than the tetramer, and preferably the dimer, of the latter compound.

The third component class (Class 3) comprises non-water-reactive materials which have a diffusion coefficient of less than about $10^{-9}$ cm$^2$/sec and have an equilibrium concentration of at least about 0.005 gm/cm$^3$ in the insulation polymer of the cable at the average operating temperature of the cable T or, preferably, at above defined flux-weighted temperature $T_{flux-avg}$. According to the instant method, the amount of Class 3 component is limited by the above described over saturation phenomenon and the amount supplied to a cable is controlled by proper formulation of the total dielectric enhancement fluid composition as well as the total quantity thereof that is injected. Thus, it is contemplated that the higher the equilibrium concentration the better. It is further preferred that the equilibrium concentration of this component is at least 0.01 gm/cm$^3$ in the insulation polymer at the average operating temperature of the cable or, preferably, at above defined flux-weighted temperature.

While not wishing to be bound by any particular theory or mechanism, it is believed that long-term efficacy of restorative fluids incorporating a Class 3 component results from the following considerations, inter alia:

a. extended dwell time in the cable insulation,
b. being at least five times more soluble than water in polymeric insulation, these materials preferentially "wet" the insulation, thereby greatly reducing the rewetting of the insulation by water permeation,
c. many Class 3 components, particularly solids, augment the density of the dielectric enhancement fluid formulation in which they are incorporated and this translates into an increased supply of total fluid mass to impart additional life-extension functionality into a given interstitial volume, and
d. this component can contain chemical functionality, not previously available, which can further extend the performance of the insulation polymer, as described infra.

Non-limiting examples of the Class 3 components include:
1. Metalocenes wherein a metallic atom such as Fe, Mn, Ni, Co, Ru or Os is "sandwiched" between two cyclopentadiene rings. Specific examples include ferrocene and derivatives thereof, such as n-butylferrocene and octanoyl ferrocene. Such components act as voltage stabilizers and UV absorbers.
2. Voltage stabilizers, such as 1,3 diketones (e.g., avobenzone), esters of acetoacetic acid (e.g., the ethyl ester or n-propyl ester; see German Patent 3017442, Aug. 3, 1983), or geranylacetone (CAS #689-67-8).
3. Hindered Amine Light Stabilizers (HALS), represented by such commercial products as TINUVIN® 123 (CAS #129757-67-1) and TINUVIN® 152 (CAS #191743-75-6) form Ciba® and Sanduvor 3058 (CAS #79720-19-7) from Cytec. Such materials are well known in the art to scavenge free radicals and mitigate the damage caused by UV emissions within polymers. Additional examples of HALS may be found in, e.g., U.S. Pat. No. 5,719,218, hereby incorporated by reference.
4. Other light stabilizers, including triazoles and nickel chelates, such as those listed in U.S. Pat. No. 4,870,121, hereby incorporated by reference. Specific examples include TINUVIN® 1130 (mixture of CAS #104810-47-1 and CAS #104810-48-2 and glycol) and TINUVIN® 479 (CAS #204848-45-3) from Ciba.
5. UV absorbing material, such as octocrylene and menthylanthranilate, benzophenone (available under with the trade name Uvinul® 3008 from BASF), substituted benzophenones and TINUVIN® 400 (CAS #153519-44-9).
6. Hydrolyzates of Class 1 or Class 2 components previously listed which meet the solubility and diffusivity criteria for class 3 components.

Those skilled in the art will readily recognize that many of the Class 3 components are solids at typical injection temperatures and, therefore, can be injected only as part of a dielectric enhancement formulation wherein the solid is either dissolved or suspended in a fluid. Of course, this restriction applies to any solid component according to the present method (e.g., ferrocene). An advantage of employing such a solid component is that it imparts an increased density to the injection formulation, which allows even more functional material to be supplied to the cable insulation.

The fourth component class (Class 4) comprises materials which have a ratio of equilibrium concentration (solubility) at 55° C. to equilibrium concentration at 22° C. in the cable insulation polymer of less than 2.25, and more preferably less than 2.0. As shown in Table 3, two prior art materials (first two rows) suffer from values in excess of 2.25; this increases the risk of supersaturation when a cable goes through significant temperature fluctuations, as described by U.S. Pat. No. 6,162,491. Class 4 materials exhibit a surprisingly low change in equilibrium concentration in the insulation polymer as a function of temperature, thereby decreasing their contribution to the above cited supersaturation phenomenon. It is noted that ferrocene is representative of both class 3 and class 4 components and that cyanopropylmethyldimethoxysilanes and cyanobutylmethyldimethoxysilanes are representative of both class 1 and class 4 components. Non-limiting examples of Class 4 materials are ferrocene (this is both a class 3 and class 4 component), 3-cyanopropylmethyldimethoxysilane and 2-cyanobutylmethyldimethoxysilane.

TABLE 3

| Material | PE Equilibrium concentration (g/cm³) | | |
|---|---|---|---|
| | @22° C. | @55° C. | Ratio @55° C./@ 22° C. |
| PhMeSi(OMe)$_2$ | 0.036 | 0.084 | 2.3 |
| Me(PhMeSiO)$_4$Me | 0.003 | 0.01 | 3.3 |
| Ferrocene | 0.009 | 0.017 | 1.9 |
| 3-Cyanobutylmethyl-dimethoxysilane | 0.0045 | 0.0079 | 1.8 |

Ph = phenyl group;
Me = methyl group

An additional advantage associated with the use of the above four described component classes is that the components according to the instant method generally exhibit relatively low vapor pressures and high flash points which decrease the fire and explosion hazard associated with injection of volatile materials.

It is also contemplated herein that any of the above described components, either individually or in combinations of two or more, as illustrated by the compositions presented in Table 1, can be used in the above method. Furthermore, these components may be included in a dielectric property-enhancing fluid composition to be used either in a conventional (low-pressure) restoration method or the previously mentioned high-pressure treatment method of United States Patent Application Publication No. US 2005/0189130 which employs special high-pressure connectors of the type described in Publication No. US 2005/0191910. In brief, the high-pressure method comprises filling the interstitial void volume of the cable with at least one dielectric property-enhancing fluid composition at a pressure below the elastic limit of the polymeric insulation jacket, and confining the dielectric property-enhancing fluid within the interstitial void volume at a residual pressure greater than about 50 psig, the pressure being imposed along the entire length of the cable and being below the elastic limit, wherein the composition includes at least one component selected from Class 1, Class 2, Class 3 or Class 4. As used herein, the term "elastic limit" of the insulation jacket of a cable section is defined as the internal pressure in the interstitial void volume at which the outside diameter (OD) of the insulation jacket takes on a permanent set at 25° C. greater than 2% (i.e., the OD increases by a factor of 1.02 times its original value), excluding any expansion (swell) due to fluid dissolved in the cable components. This limit can, for example, be experimentally determined by pressurizing a sample of the cable section with a fluid having a solubility of less than 0.1% by weight in the conductor shield and in the insulation jacket (e.g., water), for a period of about 24 hours, after first removing any covering such as insulation shield and wire wrap. After the pressure is released, the final OD is compared with the initial OD in making the above determination. The actual pressure used to fill the interstitial void volume is not critical provided the above-defined elastic limit is not attained. After the desired amount of the fluid has been introduced, the fluid is confined within the interstitial void volume at a sustained residual pressure greater than about 50 psig. It is preferred that the residual pressure is between about 100 psig and about 1000 psig, most preferably between about 300 psig and 600 psig. Further, it is preferred that the injection pressure is at least as high as the residual pressure to provide an efficient fill of the cable section (e.g., 550 psig injection and 500 psig residual). In another embodiment of this method, the residual pressure is sufficient to expand the interstitial void volume along the entire length of the cable section by at least 5%, again staying below the elastic limit of the polymeric insulation jacket. It is also contemplated that the dielectric property-enhancing fluid composition may be supplied at a pressure greater than about 50 psig for more than about 2 hours before being contained in the interstitial void volume. It is further preferred that the dielectric property-enhancing fluid composition is selected such that the residual pressure decays to essentially zero psig due to diffusion into the conductor shield and into the insulation jacket of the cable. This pressure decay generally occurs over a period of greater than about 2 hours, preferably in more than about 24 hours, and in most instances within about two years of containing the fluid composition. It is to be understood that this pressure decay results from diffusion of the various components of the composition out of the interstitial volume and not by leaking past any connector.

Figure 17:
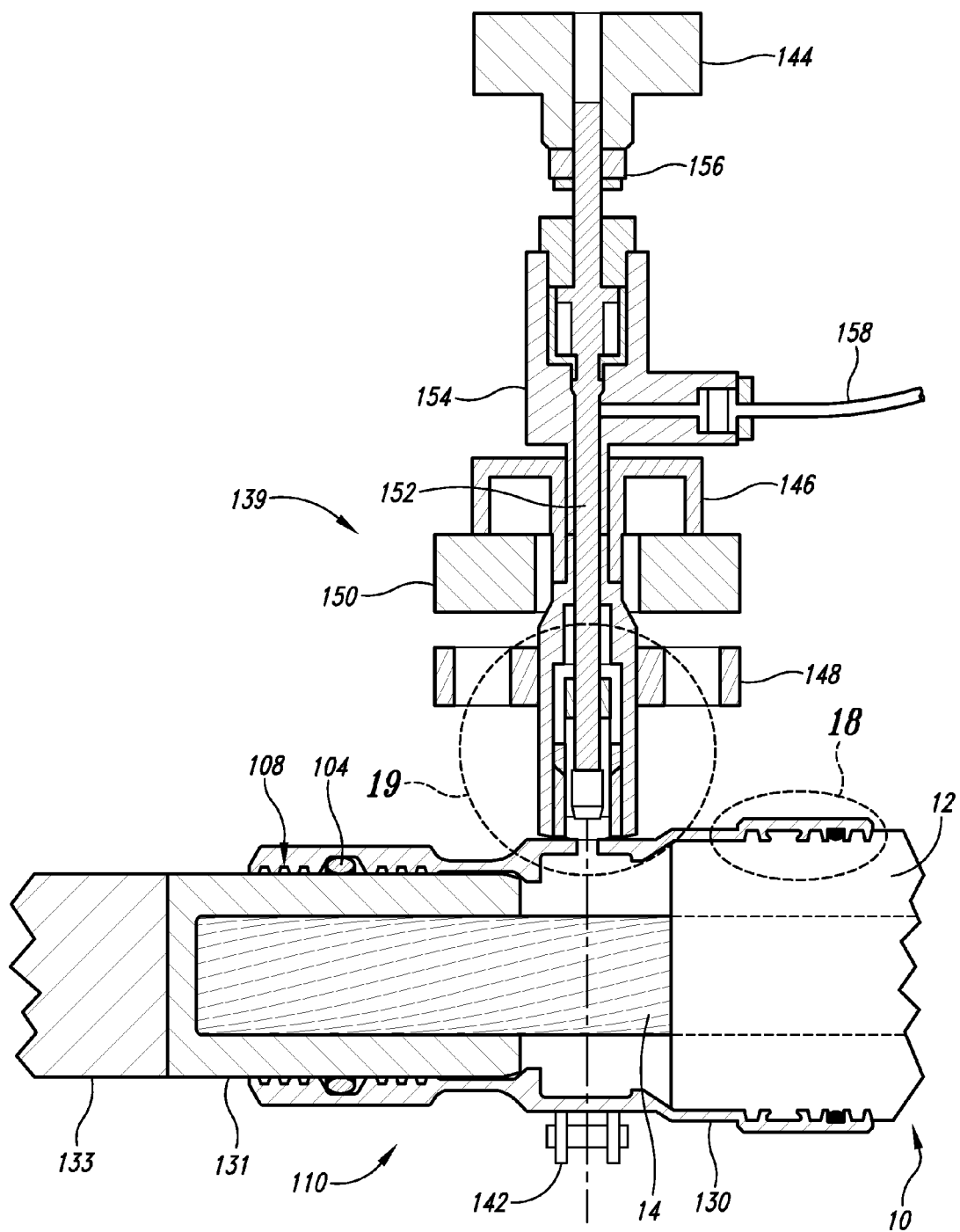
FIG. 17 is a partial cross-sectional view of an injection tool clamped in position over a swagable high-pressure terminal connector having a trapezoidal recessed groove.

A specific swagable high-pressure terminal connector of the type disclosed in Publication No. US 2005/0191910, and use thereof to inject fluid into a cable, is described as follows. As shown in FIG. 17, the insulation jacket 12 of a cable section 10 is received within a first end portion of a housing 130 of the connector 110. The first end portion of the housing 130 is sized such that its internal diameter (ID) is just slightly larger than the outer diameter (OD) of insulation jacket 12. As will be described in greater detail below, a swage is applied to the exterior of the first end portion of the housing 130 over an O-ring 134 which resides in an interior circumferentially-extending O-ring groove 135 in housing 130, multiple interior circumferentially-extending Acme thread-shaped grooves 138 in the housing, and an interior circumferentially-extending generally trapezoidal groove 136 in the housing. This insulation swaging region is shown in detail in the DETAIL A of FIG. 17 and enlarged in FIG. 18.

Figure 18:
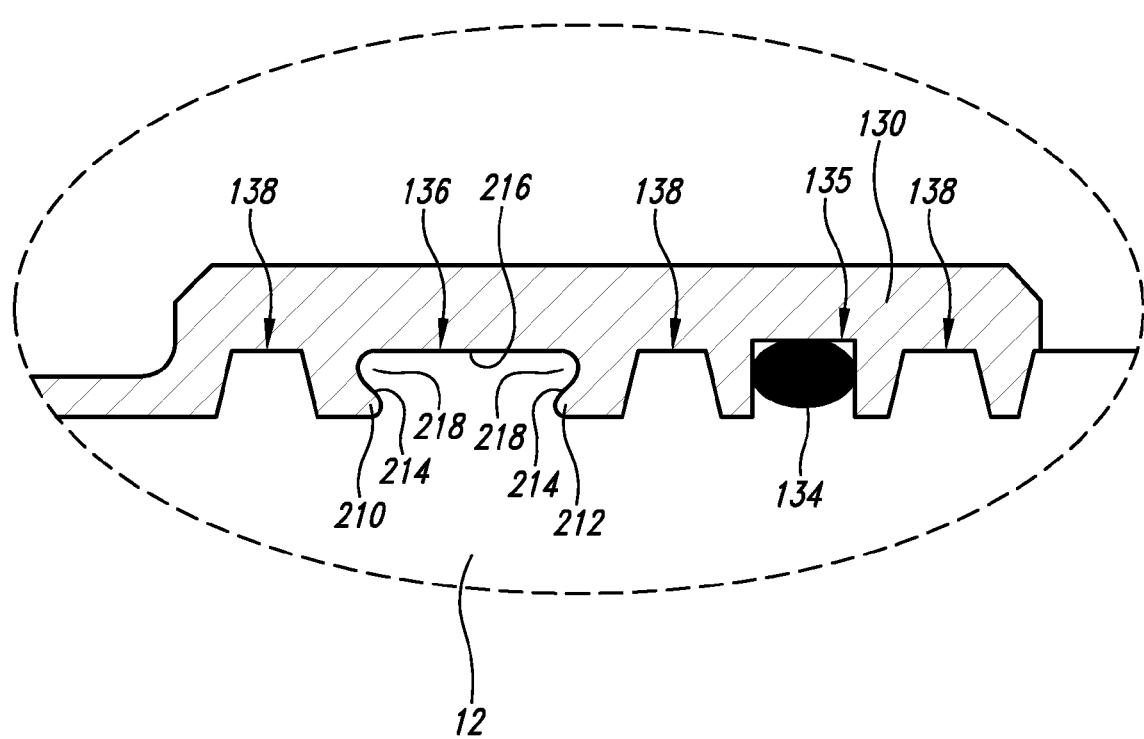
FIG. 18 is a cross-sectional view of detail area A of FIG. 17 showing the swaging region over the insulation jacket.

Referring to FIGS. 17 and 18, the trapezoidal groove 136 has a pair of oppositely-oriented, axially-projecting circumferentially-extending spurs 210 and 212. The spurs 210 and 212 are disposed essentially at an interior wall of the housing 130, and project in opposite axial directions and toward each other. The spurs 210 and 212 are provided by forming the circumferential groove 136 in the interior wall of the housing 130 at an axial position along the first end portion of the housing within the above described insulation swaging region over the insulation jacket (i.e., within the engagement portion of the housing). The circumferential groove 136 and the spurs 210 and 212, extend completely around the inner circumference of the inner wall of the housing 130. Each spur 210 and 212 has a generally radially outward facing wall 214 spaced radially inward from a radially inward facing recessed wall portion 216 of the housing 130 located within the groove. A pair of circumferentially-extending recesses 218 within the groove 136 are defined between the radially outward facing walls 214 of the spurs 210 and 212 and the radially inward facing recessed wall portion 216 of the housing 130. The recesses 218 form axially-opening undercut spaces located radially outward of the spurs within which a portion of the insulation jacket 12 of the cable section 10 is pressed and at least partially flows as a result of the swage applied to the exterior of the first end portion of the housing 130 in the insulation swaging region described above and the cable being placed in service. This operation forces at least some polymer of insulation jacket 12 into the groove 136 and further into the recesses 218 (i.e., into the undercuts). Essentially, the polymer of the insulation jacket 12 within the groove 136 and the groove itself form an interlocking joint, much like a dovetail mortise and tenon joint or union. As a result, a fluid-tight seal is formed between the insulation jacket 12 and the housing 130, which not only prevents push-back of the insulation jacket, but also provides leak-free operation when the cable section contains fluid at elevated pressure and is subjected to substantial thermal cycling that otherwise might cause relative radial movement and separation of the insulation jacket and the housing, and hence fluid leakage during the cooling phase of a thermal cycle. For the purposes herein, "substantial thermal cycling" refers to thermal cycling wherein the mode (i.e., peak) of the distribution with respect to time of ΔT, the difference between the high and low conductor temperatures, is at least about 20° C.

In the high-pressure connector shown in FIGS. 17 and 18, the insulation swaging region over the insulation jacket 12 (engagement portion of the housing 130) comprises at least one trapezoidal housing groove 136 as well as the O-ring 134, the latter residing in the separate O-ring groove 135. FIG. 17 shows a partial cross-sectional view of an injection tool 139 clamped in position over the swagable high-pressure terminal connector 110 just prior to injection of dielectric enhancement fluid into the cable section 10, as further described below. In a typical assembly procedure using this embodiment, the insulation jacket 12 of cable section 10 is first prepared for accepting a termination crimp connector 131 of the connector, as described in above cited Publication No. US 2005/0191910. The housing 130 of the connector 110 includes an injection port 48 (see detail B, FIG. 19). As described above, the housing is sized such that its larger internal diameter (ID) at the first end portion of the housing is just slightly larger than the outer diameter (OD) of insulation jacket 12 and its smaller ID at an opposite second end portion is just slightly larger than the OD of the termination crimp connector 131. The housing 130 is slid over the conductor 14 of the cable section 10 and over the insulation jacket 12 of the cable section, and the termination crimp connector 131 is then slipped over the end of the conductor 14 and within the housing. The second end portion of the housing 130, having first O-ring 104 residing in a groove therein, is first swaged with respect to termination crimp connector 131. This first swage is applied over the first O-ring 104 and the essentially square machined interior teeth 108 of the housing 130. Swaging can be performed in a single operation to produce swaging together of the conductor 14 and the termination crimp connector 131, and swaging together of the housing 130 and the termination crimp connector 131. Alternatively, swaging can be performed in phases (wherein the termination crimp connector 131 is swaged together with conductor 14 before the housing 130 is swaged together with the resulting termination crimp connector/conductor combination. This swaging operation joins the conductor 14, the termination crimp connector 131, and the housing 130 in intimate mechanical, thermal and electrical union and provides a redundant seal to the O-ring 104 to give a fluid-tight seal between the housing 130 and the termination crimp connector 131. It is also possible to perform the swaging operation over the insulation before swaging over the conductor, but the above sequence is preferred.

In FIG. 17, a copper termination lug 133 is spin welded to the aluminum termination crimp connector 131 to provide a typical electrical connection. The swaged assembly is then (optionally) twisted to straighten the lay of the outer strands of the conductor 14 to facilitate fluid flow into and out of the strand interstices. A second swage is then applied to the exterior of the first end portion of the housing 130 over the second O-ring 134 (which resides in the separate interior groove 135 in the housing 130), the Acme thread-shaped grooves 138, and the trapezoidal groove 136 (i.e., over the insulation swaging region of DETAIL A of FIG. 17 and enlarged in FIG. 18). O-rings 104 and 134 can be fabricated from a fluoroelastomer such as Viton®, ethylene-propylene rubber (EPR), or, preferably, ethylene-propylene diene monomer (EP DM) rubber while housing 130 is preferably made of stainless steel. This swaging operation forces at least some polymer of insulation jacket 12 into the trapezoidal groove 136 and the Acme thread grooves 138, while simultaneously deforming O-ring 134 to the approximate shape depicted in FIG. 18. As a result, a fluid-tight seal is formed between insulation jacket 12 and the first end portion of the housing 130, which seal prevents pushback of the insulation and provides leak-free operation when the cable section 10 contains fluid at elevated pressure and is subjected to substantial thermal cycling, as described above. At this point, the swaged connector 110, and cable section 10 to which it is attached, is ready to be injected with a dielectric enhancement fluid at an elevated pressure.

Figure 19:
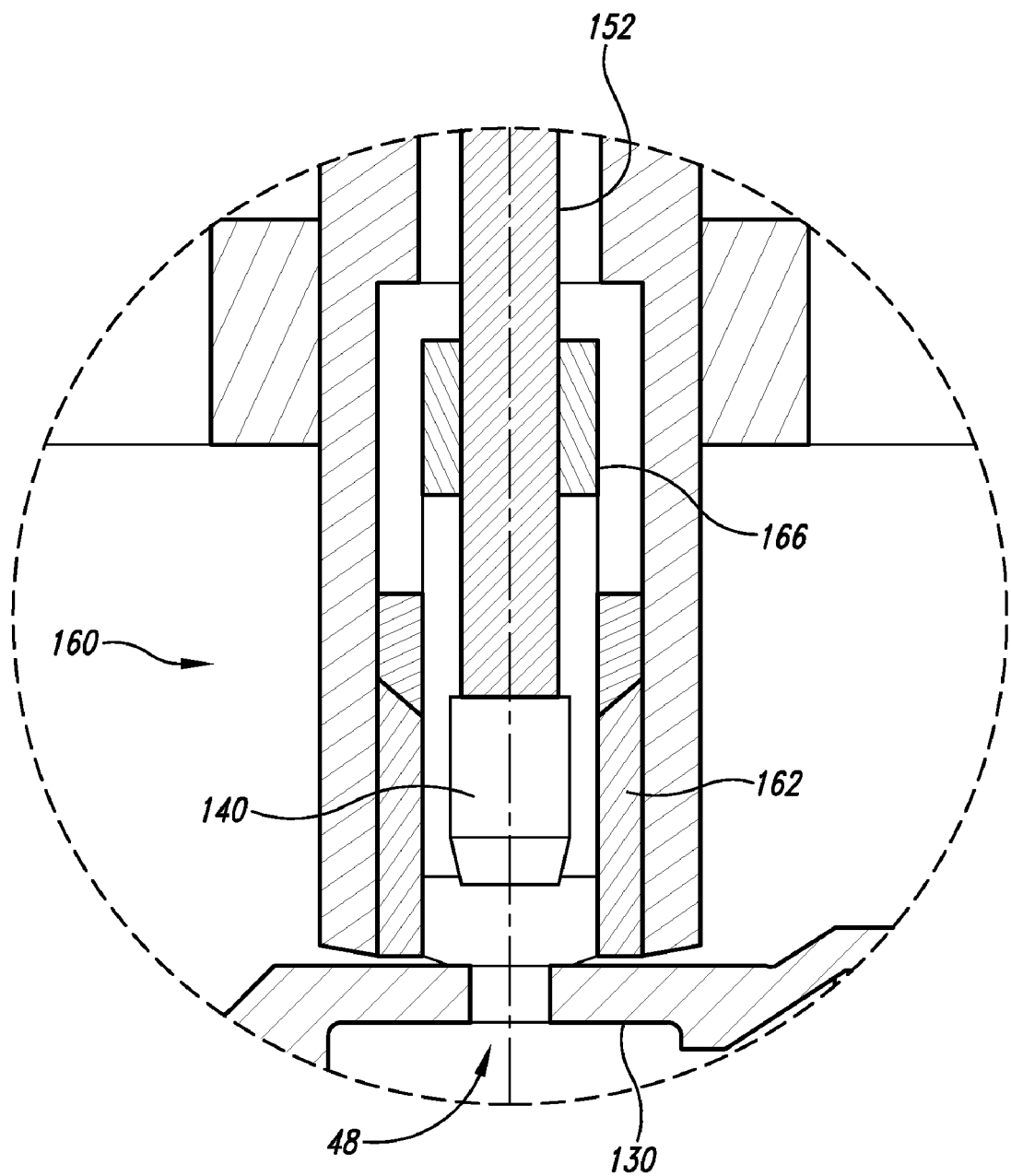
FIG. 19 is a cross-sectional view of detail area B of FIG. 17 showing the seal tube and injector tip.
Figure 20:
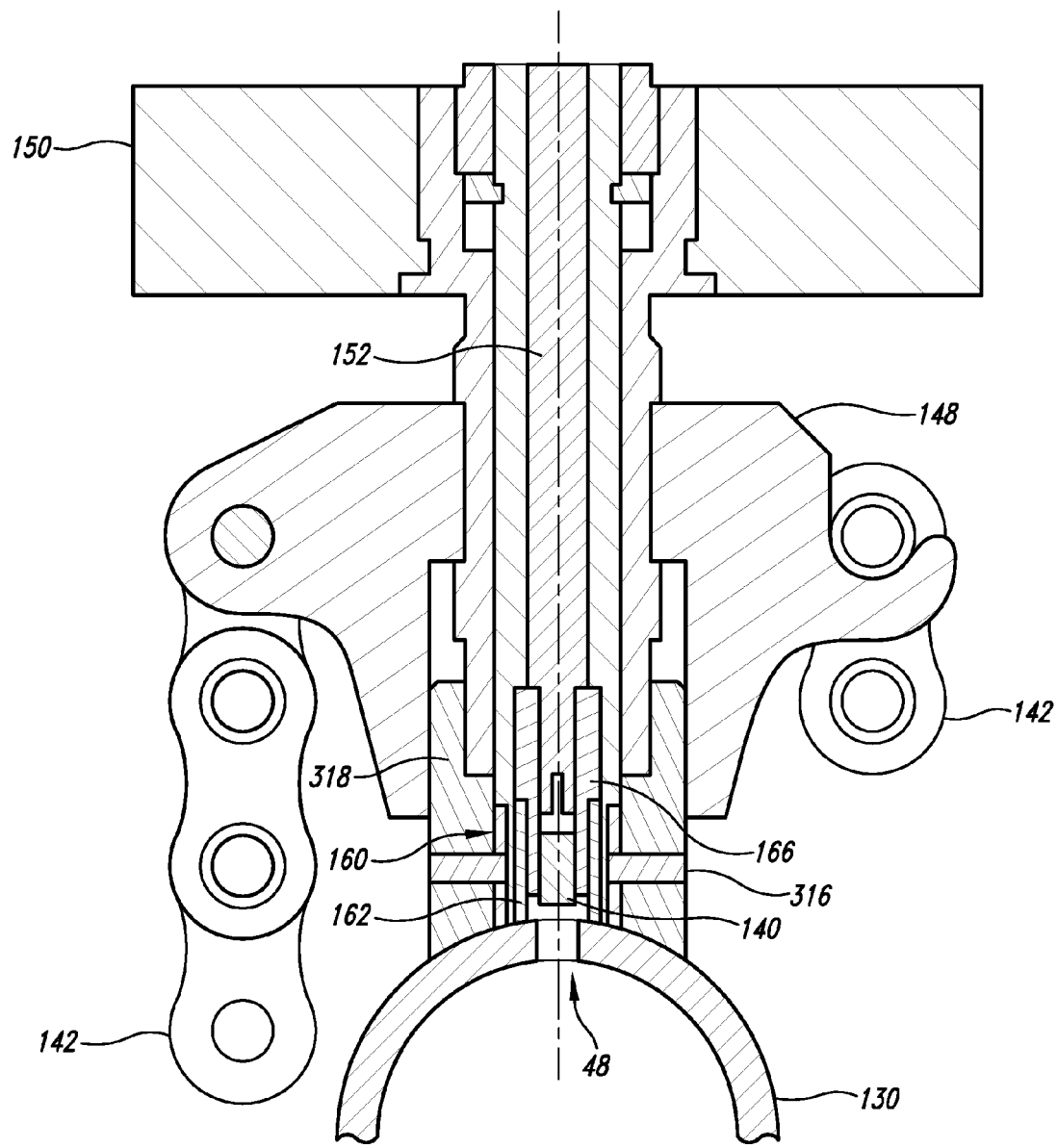
FIG. 20 is an enlarged cross-sectional view of the lower portion of the injection tool shown in FIG. 17 along the axial direction of the injection tool.
Figure 21:
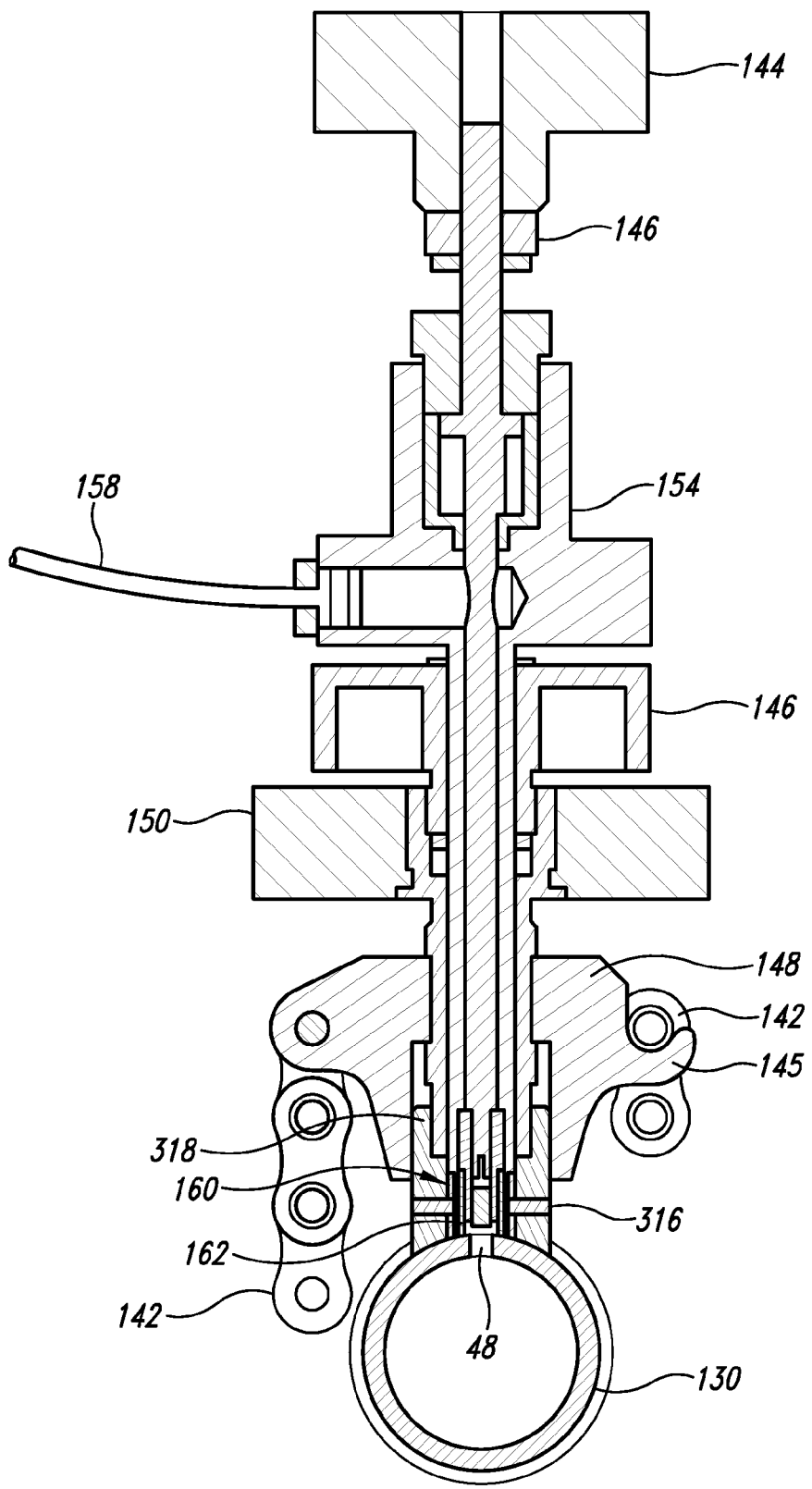
FIG. 21 is another enlarged cross-sectional view of the injection tool shown in FIG. 17 along the axial direction of the injection tool.

In a typical injection procedure, a plug pin 140, further described below, is loaded into a seal tube injector tip 160 of the injection tool 139 such that it is held in place by a spring collet 166, as shown in FIG. 19. Spring collet 166 comprises a partially cutout cylinder that has two 180° opposing "fingers" (not shown) which the grip plug pin 140 with sufficient force such that the latter is not dislodged by handling or fluid flow, but can be dislodged when the plug pin 140 is inserted into the injection port 48, as shown in detail in FIG. 19. The dielectric enhancement fluid to be injected, can flow between these "fingers" of spring collet 166. Referring to FIGS. 17 and 19, a yoke 148 is positioned over housing 130 and its center line is aligned with injection port 48 using a precision alignment pin (not shown), the latter being threaded into the yoke 148. The precision alignment pin brings the axis of a clamp knob 150 and the injection port 48 into precise alignment. A clamp chain 142, attached at a one side to the yoke 148, is wrapped around the housing 130 and then again attached to a hook 145 (see FIG. 21) on the other side of the yoke 148. The now loosely attached chain is tightened by turning the clamp knob 150 (by means of threads—not shown). The precision alignment pin is unthreaded and removed from the yoke 148. The injection tool 139 is threaded into the yoke 148, and a seal knob 146 is then threaded into the clamp knob 150 to compress a polymeric seal 162 against the exterior of the housing 130, the entire injection tool 139 now being in precise alignment with injection port 48. At this point there is a fluid-tight seal between the seal tube injector tip 160 and the housing 130, thereby providing a flow path (for fluid) through the injection port 48 between the interior of the injection tool 139 and the interior of the housing 130, as shown in FIG. 19. For further clarity, FIGS. 20 and 21 provide enlarged cross-sectional views of (at least a portion of) the injection tool 139 in a direction along the axial direction of housing 130. These figures show a slide block 318 which presses against the housing 130 with a force equal to approximately twice the tension of chain 142. Guide pins 316 align with slots in the seal tube injector tip 160 and orient it with respect to housing 130 such that the axes of their respective curvatures are aligned, thus allowing a fluid-tight seal to be made.

Figure 22:
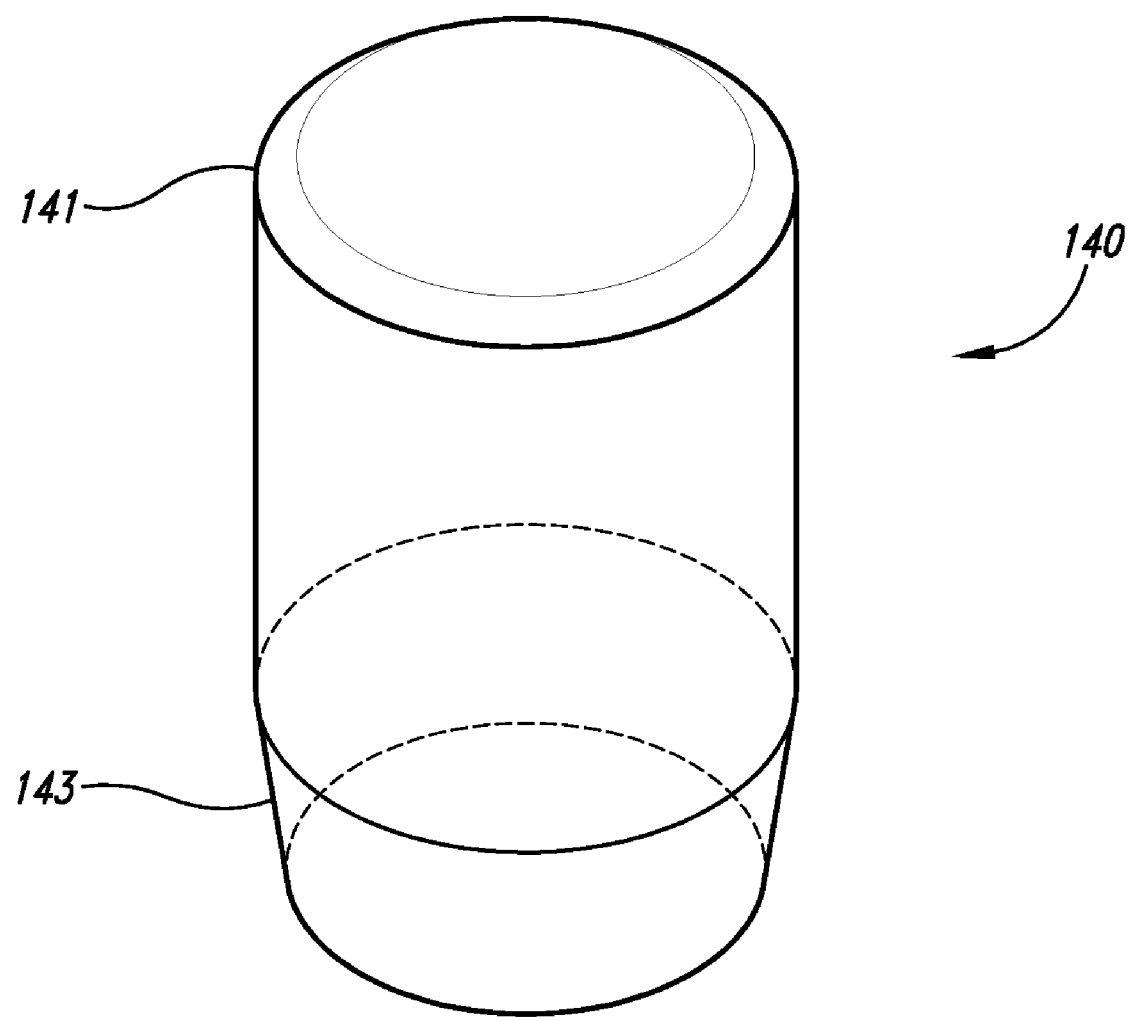
FIG. 22 is a perspective view of a plug pin used to seal the injection port of the connector shown in FIG. 17.

A pressurized dielectric enhancement fluid composition is then introduced to the interior of connector 110 and the interstitial void volume of cable section 10 via a tube 158, a seal tube inlet 154 and an annulus (not shown) formed between the seal tube injector tip 160 and the assembly of a press pin 152 and the plug pin 140. After the predetermined amount of fluid has been introduced (or a predetermined uniform pressure along the full length of the cable section has been attained, as described in detail in above cited Publication No. 2005/0189130 A1), a press pin actuator knob 144 is tightened (utilizing mated threads in the injection tool 139—not shown) so as to advance press pin 152 toward injection port 48, thereby pushing plug pin 140 into injection port 48 such that the nominally circular end surface of plug pin 140, located adjacent to a first chamfered end 141 of the plug pin, is essentially flush with the exterior surface of the housing 130. The first chamfered end 141 of the plug pin 140, illustrated in perspective view in FIG. 22, assures a post injection "no snag" exterior surface for the finished assembly of housing 130. The plug pin 140 has as a diameter slightly larger than the diameter of injection port 48 to provide a force fit therein. Finally, plug pin 140 also has a second chamfered end 143 to allow self-guidance into injection port 48 and to allow the force fit with injection port 48 to create a fluid-tight seal. Plug pin 140 can subsequently be pushed into the interior of the connector 110 in the event that additional fluid is to be injected or the system needs to be bled for any reason, and later a slightly larger plug pin can be re-inserted. At this point, the pressurized fluid supply is discontinued and injection tool 139 is disconnected from connector 110 to complete the injection process. Implicit in the above description of the injection step is the presence of a similar splice (or terminal) high-pressure connector at the other end of the cable section being injected at elevated pressure, as required by the instant integrated method. Thus, when the interstitial void volume of the section is completely filled, and preferably partially bled at the end opposite from the injection end of the cable section, the fluid is confined within the interstitial void volume of the section as well as within the high-pressure connectors, thereby introducing the required amount of the fluid to the cable section which has insufficient interstitial volume, as discussed above and in previously cited Publication No. 2005/0189130. As in the case of the latter method, it is contemplated herein that the dielectric property-enhancing fluid composition may be supplied at a pressure greater than about 50 psig for more than about 2 hours before being confined within the interstitial void volume. Those skilled in the art will also readily appreciate that, while the description of the above embodiment illustrates injection through a terminal high-pressure connector, the cable section 10 can be a cable segment or a cable sub-segment, as defined above. Thus, for example, it is contemplated herein that the cable section could comprise at least one high-pressure splice comprising two connectors which are swaged to opposite ends of a splice strand connector, as illustrated by the (similar) dual housing high-pressure splice connector shown in FIG. 8 of above cited Publication No. 2005/0191910.

That which is claimed is:

1. A method for extending the useful life of at least one in-service electrical cable section having a stranded conductor surrounded by a conductor shield encased in a polymeric insulation and having an interstitial void volume in the region of the conductor, the cable section having an average operating temperature T, the method comprising: injecting a dielectric enhancement fluid composition into the interstitial void volume, the composition comprising at least one component selected from
   (1) a water-reactive material selected from:
      (i) an organosilane monomer having at least two water-reactive groups,
      (ii) the above organosilane monomer (i) wherein at least one of the water-reactive groups has been substituted with a condensable silanol group,
      (iii) an oligomer of the above organosilane monomer (i), or
      (iv) a co-oligomer of the above organosilane monomer (i), the organosilane monomer (i) having a diffusion coefficient at least about 15 times greater than the diffusion coefficient of its corresponding tetramer, the diffusion coefficient being determined in the polymeric insulation at temperature T;
   (2) a water-reactive material selected from
      (i) an organosilane monomer having at least two water-reactive groups,
      (ii) the above organosilane monomer (i) wherein at least one of the water-reactive groups has been substituted with a condensable silanol group,
      (iii) an oligomer of the above organosilane monomer (i), or
      (iv) a co-oligomer of the above organosilane monomer (i), the water-reactive material (2) having at least one group attached to silicon comprising 7 to about 20 —$CH_2$— units;
   (3) a non-water-reactive organic material which has a diffusion coefficient of less than about $10^{-9}$ $cm^2$/sec and an equilibrium concentration of at least about 0.005 $gm/cm^3$ in the polymeric insulation, the diffusion coefficient and the equilibrium concentration being determined at temperature T; or
   (4) an organic compound having an equilibrium concentration in the polymeric insulation at 55° C. which is less than 2.25 times the equilibrium concentration at 22° C.

2. The method according to claim 1, wherein the component is selected from an alkoxy-functional organosilane monomer or an enoloxy-functional organosilane monomer, the monomer having a diffusion coefficient at least about 15 times greater than the diffusion coefficient of its corresponding tetramer.

3. The method according to claim 2, wherein the component is an organoalkoxysilane.

4. The method according to claim 3, wherein the dielectric enhancement fluid composition further comprises a condensation catalyst.

5. The method according to claim 4, wherein the organoalkoxysilane is selected from:
   (3-methylphenyl)methyldimethoxysilane,
   di(p-tolyl)dimethoxysilane,
   (4-methylphenyl)methyldimethoxysilane,
   phenethyltrimethoxysilane,
   (p-styrlethyl)trimethoxysilane,
   3-(2,4-dinitrophenylamino)propyltriethoxysilane, or
   3-(triethoxysilylpropyl)p-nitrobenzamide.

6. The method according to claim 4, wherein the component is selected from (p-tolylethyl)methyldimethoxysilane, 3-cyanopropylmethyldimethoxysilane, or 2-cyanobutylmethyldimethoxysilane.

7. The method according to claim 2, wherein the component is selected from methylphenyl bis(1-phenyl ethenyloxy)silane or methylvinyl bis(1-phenyl ethenyloxy)silane.

8. The method according to claim 1, wherein the component is selected from an alkoxy-functional organosilane monomer or an enoloxy-functional organosilane monomer, the component having at least one group attached to silicon comprising 7 to about 20 —$CH_2$— units.

9. The method according to claim 8, wherein the component is an organoalkoxysilane monomer and the dielectric enhancement fluid composition further comprises a condensation catalyst.

10. The method according to claim 9, wherein the organoalkoxysilane is selected from:
    phenyloctyldialkoxysilane,
    dodecylmethyldialkoxysilane,
    n-octadecyldimethylmethoxysilane,
    n-decyltriethoxysilane,
    dodecylmethyldiethoxysilane,
    dodecyltriethoxysilane, hexadecyltrimethoxysilane,
1-docosenyltriethoxysilane,
n-octyltrimethoxysilane, or
n-octadecyltrimethoxysilane.

11. The method according to claim 1, wherein the component has a diffusion coefficient of less than about $10^{-9}$ cm$^2$/sec and an equilibrium concentration of at least about 0.005 gm/cm$^3$ in the polymeric insulation and is selected from a metalocene, a 1,3 diketone, a HALS compound, a triazole, a nickel chelate, or a UV absorbing compound.

12. The method according to claim 11, wherein the component has an equilibrium concentration of at least about 0.01 gm/cm$^3$ in the polymeric insulation.

13. The method according to claim 11, wherein the component is selected from n-butylferrocene, octanoyl ferrocene, avobenzone, benzopheonone, octocrylene, menthylanthranilate, an ethyl ester of acetoacetic acid, an n-propyl ester of acetoacetic acid, or a compound selected from the following
   bis-(1-octyloxy-2,2,6,6-tetramethyl-4-piperidinyl)sebacate,
   2,4-bis[N-Butyl-N-(1-cyclohexyloxy-2,2,6,6-tetramethylpiperidin-4-yl)amino]-6-(2-hydroxyethylamine)-1,3,5-triazine,
   2-docecyl-N-(2,2,6,6-tetramethyl-4-piperidinyl)succinimide,
   a mixture of [3-[3-(2H-Benzotriazol-2-yl)-5-(1,1-dimethylethyl)-4-hydroxyphenyl]-1-oxopropyl]-hydroxypoly(oxo-1,2-ethanediyl) and
   (3-(3-(2H-benzotriazol-2-yl)-5-(1,1-dimethylethyl)-4-hydroxyphenyl)-1-oxopropyl)-w-(3-(3-(2hbenzotriazol-2-yl)-5-(1,1-dimethylethyl)-4-hydroxyphenyl)-1-oxopropoxy)poly(oxy-1,2-ethanediyl) and glycol, or
   isooctyl 2-[4-[4,6-bis[(1,1'-biphenyl)-4-yl]-1,3,5-triazin-2-yl]-3-hydroxyphenoxy]propanoate.

14. The method according to claim 13, wherein the component is selected from avobenzone, octocrylene, or menthylanthranilate.

15. The method according to claim 1, wherein the component is an organic compound having an equilibrium concentration in the polymeric insulation at 55° C. which is less than 2.25 times the equilibrium concentration at 22° C.

16. The method according to claim 15, wherein the component is ferrocene.

17. The method according to claim 15, wherein the component is selected from cyanopropylmethyldimethoxysilane or cyanobutylmethyldimethoxysilane.

18. A method for extending the useful life of at least one in-service electrical cable section having a stranded conductor surrounded by a conductor shield encased in a polymeric insulation and having an interstitial void volume in the region of the conductor, the cable section having a flux-weighted operating temperature $T_{flux-avg}$, the method comprising:
   injecting a dielectric enhancement fluid composition into the interstitial void volume, the composition comprising at least one component selected from
   (1) a water-reactive material selected from
      (i) an organosilane monomer having at least two water-reactive groups,
      (ii) the above organosilane monomer (i) wherein at least one of the water-reactive groups has been substituted with a condensable silanol group,
      (iii) an oligomer oligomer of the above organosilane monomer (i), or
      (iv) a co-oligomer of the above organosilane monomer (i), the organosilane monomer (i) having a diffusion coefficient at least about 15 times greater than the diffusion coefficient of its corresponding tetramer, the diffusion coefficient being determined at temperature $T_{flux-avg}$;
   (2) a water-reactive material selected from
      (i) an organosilane monomer having at least two water-reactive groups,
      (ii) the above organosilane monomer (i) wherein at least one of the water-reactive groups has been substituted with a condensable silanol group,
      (iii) an oligomer oligomer of the above organosilane monomer (i), or
      (iv) a co-oligomer of the above organosilane monomer (i), the water-reactive material (2) having at least one group attached to silicon comprising 7 to about 20 —CH$_2$— units;
   (3) a non-water-reactive organic material which has a diffusion coefficient of less than about $10^{-9}$ cm$^2$/sec and an equilibrium concentration of at least about 0.005 gm/cm$^3$ in the polymeric insulation, the diffusion coefficient and the equilibrium concentration being determined at temperature Tflux-avg; or
   (4) an organic compound having an equilibrium concentration in the polymeric insulation at 55° C. which is less than 2.25 times the equilibrium concentration at 22° C.

* * * * *

UNITED STATES PATENT AND TRADEMARK OFFICE
CERTIFICATE OF CORRECTION

PATENT NO. : 8,101,034 B2  
APPLICATION NO. : 12/349440  
DATED : January 24, 2012  
INVENTOR(S) : Glen J. Bertini and Gary A. Vincent Page 1 of 1

It is certified that error appears in the above-identified patent and that said Letters Patent is hereby corrected as shown below:

Title Page, Insert

-- (60) Division of U.S. patent application Ser. No. 11/468,274, filed Aug. 29, 2006, now U.S. Pat. No. 7,658,808, provisional application Ser. No. 60/712,309, filed on Aug. 30, 2005, and provisional application Ser. No. 60/712,944, filed on Aug. 30, 2005. --

Signed and Sealed this
Twenty-seventh Day of August, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,101,034 B2
APPLICATION NO. : 12/349440
DATED : January 24, 2012
INVENTOR(S) : Glen J. Bertini and Gary A. Vincent Page 1 of 1

It is certified that error appears in the above-identified patent and that said Letters Patent is hereby corrected as shown below:

In the Claims
Claim 18, column 36, line 16 should read: "(iii) an oligomer of the above organosilane"
Claim 18, column 36, line 30 should read: "(iii) an oligomer of the above organosilane"

Signed and Sealed this
Twenty-fifth Day of March, 2014

Michelle K. Lee
*Deputy Director of the United States Patent and Trademark Office*